US011282331B2

(12) United States Patent
Nelson et al.

(10) Patent No.: US 11,282,331 B2
(45) Date of Patent: Mar. 22, 2022

(54) MIXED REALITY SYSTEMS AND METHODS FOR ENHANCING GAMING DEVICE EXPERIENCES

(71) Applicant: IGT, Las Vegas, NV (US)

(72) Inventors: Dwayne Nelson, Las Vegas, NV (US); Patrick Danielson, Las Vegas, NV (US)

(73) Assignee: IGT, Las Vegas, NV (US)

(*) Notice: Subject to any disclaimer, the term of this patent is extended or adjusted under 35 U.S.C. 154(b) by 48 days.

(21) Appl. No.: 16/057,398

(22) Filed: Aug. 7, 2018

(65) Prior Publication Data

US 2020/0051371 A1  Feb. 13, 2020

(51) Int. Cl.
*G07F 17/32* (2006.01)
*G06T 19/00* (2011.01)
*A63F 13/26* (2014.01)

(52) U.S. Cl.
CPC .......... *G07F 17/3213* (2013.01); *A63F 13/26* (2014.09); *G06T 19/006* (2013.01); *G07F 17/323* (2013.01); *G07F 17/3209* (2013.01); *G07F 17/3218* (2013.01); *G07F 17/3239* (2013.01); *G07F 17/3258* (2013.01); *G07F 17/3267* (2013.01); *G07F 17/3288* (2013.01)

(58) Field of Classification Search
CPC .. G07F 17/3211; G07F 17/34; G07F 17/3218; G07F 17/3206; G07F 17/3209; G07F 17/3225; G07F 17/3223; G07F 17/3213; G07F 17/3204; G07F 17/323; G07F 17/3237; G07F 17/3239; G07F 17/326; A63F 13/25; A63F 13/12; A63F 2009/2457; A63F 13/213; G06T 19/006; G02B 2027/0178; G02B 27/017
See application file for complete search history.

(56) References Cited

U.S. PATENT DOCUMENTS

| | | | |
|---|---|---|---|
| 8,235,529 B1 | 8/2012 | Raffle et al. |
| 8,558,759 B1 | 10/2013 | Prada et al. |
| 8,821,274 B2 | 9/2014 | Lyons et al. |
| 8,943,420 B2 | 1/2015 | Goldthwaite et al. |
| 9,280,867 B2 | 3/2016 | Froy et al. |
| 9,280,868 B2 | 3/2016 | Froy et al. |
| 9,285,592 B2 | 3/2016 | Olsson et al. |
| 9,412,201 B2 | 8/2016 | Kinnebrew et al. |
| 9,558,612 B2 | 1/2017 | Lyons et al. |
| 9,568,620 B2 | 1/2017 | Froy et al. |

(Continued)

*Primary Examiner* — Justin L Myhr
(74) *Attorney, Agent, or Firm* — Sage Patent Group

(57) ABSTRACT

A mixed reality system includes a video capture device, a display, a processing device, and a memory coupled to the processing device. The memory includes machine readable instructions for causing the processing device to generate, via the video capture device, a live video signal of a scene associated with a field of view of a user, wherein the scene includes a gaming device displaying a plurality of first gaming elements as part of a wagering game. The memory further includes machine readable instructions for causing the processing device to determine, based on the live video signal, virtual element in real time. The memory further includes machine readable instructions for causing the processing device to display the virtual element to the user, via the display, as part of the scene so that the virtual element is associated with the gaming device.

19 Claims, 20 Drawing Sheets

(56) References Cited

U.S. PATENT DOCUMENTS

| | | |
|---|---|---|
| 9,569,920 B2 | 2/2017 | Froy et al. |
| 2004/0043812 A1* | 3/2004 | Ellis ........................ G07F 17/34 |
| | | 463/20 |
| 2008/0004098 A1* | 1/2008 | Bennett ............... G07F 17/3211 |
| | | 463/16 |
| 2009/0131145 A1* | 5/2009 | Aoki ................... G07F 17/3267 |
| | | 463/20 |
| 2011/0065496 A1* | 3/2011 | Gagner ............... G07F 17/3209 |
| | | 463/25 |
| 2012/0118947 A1* | 5/2012 | Lyons ................. G07F 17/3241 |
| | | 235/375 |
| 2012/0165090 A1* | 6/2012 | Duffy ...................... G07F 17/32 |
| | | 463/25 |
| 2012/0231869 A1* | 9/2012 | Englman ............. G07F 17/3244 |
| | | 463/20 |
| 2013/0184061 A1* | 7/2013 | Meunier ............. G07F 17/3204 |
| | | 463/25 |
| 2014/0121015 A1 | 5/2014 | Massing et al. |
| 2014/0168261 A1 | 6/2014 | Margolis et al. |
| 2015/0065219 A1* | 3/2015 | Kiely ................... G07F 17/3211 |
| | | 463/13 |
| 2016/0012662 A1* | 1/2016 | Jackson ................ G07F 17/322 |
| | | 463/46 |
| 2016/0373570 A1 | 12/2016 | Scavezze et al. |
| 2017/0148250 A1* | 5/2017 | Angermayer ........... G06T 19/20 |
| 2017/0193708 A1* | 7/2017 | Lyons ................. G07F 17/3211 |

* cited by examiner

US 11,282,331 B2

MIXED REALITY SYSTEMS AND METHODS FOR ENHANCING GAMING DEVICE EXPERIENCES

BACKGROUND

Embodiments described herein relate to mixed reality systems and methods, and in particular to mixed reality systems and methods for enhancing gaming device experiences. Electronic gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three dimensional display screens.

BRIEF SUMMARY

According to one embodiment, a method is disclosed. The method includes generating a live video signal of a scene associated with a field of view of a user, wherein the scene includes a gaming device displaying a plurality of first gaming elements as part of a wagering game. The method further includes determining, based on the live video signal, virtual element in real time. The method further includes displaying the virtual element to the user as part of the scene so that the virtual element is associated with the gaming device.

According to another embodiment, a mixed reality controller is disclosed. The controller includes a processing device and a memory coupled to the processing device. The memory includes machine readable instructions for causing the processing device to cause a video capture device to generate a live video signal of a scene associated with a field of view of a user, wherein the scene comprises a gaming device displaying a plurality of first gaming elements as part of a wagering game. The memory further includes machine readable instructions for causing the processing device to determine, based on the live video signal, a virtual element in real time. The memory further includes machine readable instructions for causing the processing device to cause a display device to display the virtual element to the user as part of the scene so that the virtual element is associated with the gaming device.

According to another embodiment, a mixed reality system is disclosed. The system includes a video capture device, and a display. The system further includes a processing device, and a memory coupled to the processing device. The memory includes machine readable instructions for causing the processing device to generate, via the video capture device, a live video signal of a scene associated with a field of view of a user, wherein the scene includes a gaming device displaying a plurality of first gaming elements as part of a wagering game. The memory further includes machine readable instructions for causing the processing device to determine, based on the live video signal, virtual element in real time. The memory further includes machine readable instructions for causing the processing device to display the virtual element to the user, via the display, as part of the scene so that the virtual element is associated with the gaming device.

DETAILED DESCRIPTION

According to some embodiments, a live video signal of a scene associated with a field of view of a user is generated, including a gaming device displaying gaming elements as part of a wagering game. Based on the live video signal, a virtual element is generated in real time and is displayed to the user as part of the scene so that the virtual element is associated with the gaming device. These and other embodiments are described in more detail below.

Advantages of this and other arrangements include the ability to provide additional content to a user of an EGM without the need to make changes to the EGM itself. One technical problem with adding features to an EGM is that new hardware and/or software may be required to enable these added features. Some features may also be impractical and/or impossible to implement without mixed reality hardware and/or software capabilities. One technical solution to these and other problems is the use of mixed reality implementations for these features, which can reduce the need for modifying the EGM.

Figure 1:
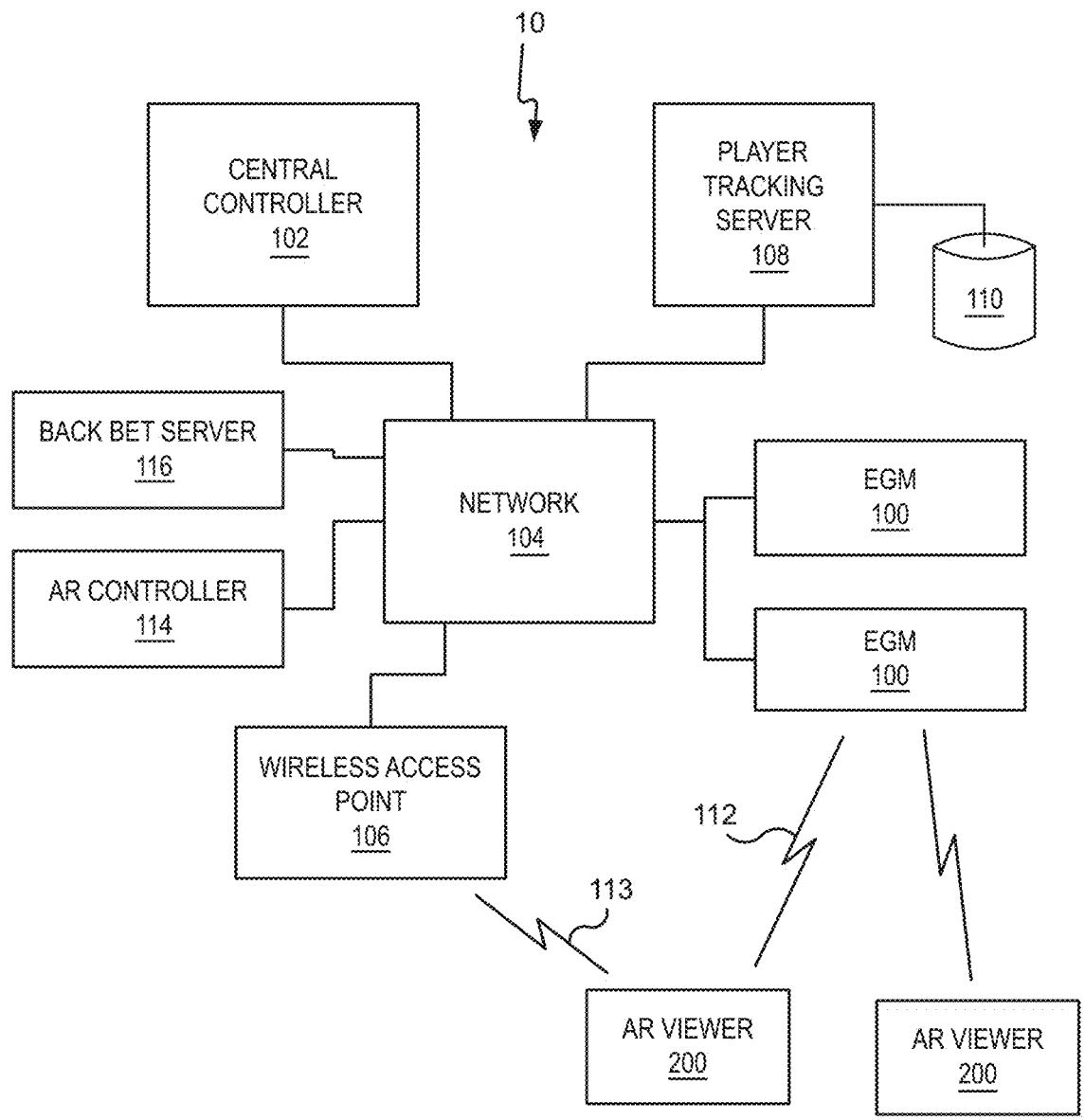
FIG. 1 is a schematic block diagram illustrating a network configuration for a plurality of gaming devices according to some embodiments.

Referring to FIG. 1, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 102 through a data network or remote communication link 104. The data communication network 104 may be a private data communication network that is operated, for example, by the gaming facility that operates the EGM 100. Communications over the data communication network 104 may be encrypted for security. The central controller 102 may be any suitable server or computing device which includes at least one processor and at least one memory or storage device. Each EGM 100 may include a processor that transmits and receives events, messages, commands or any other suitable data or signal between the EGM 100 and the central controller 102. The EGM processor is operable to execute such communicated events, messages or commands in conjunction with the operation of the EGM. Moreover, the processor of the central controller 102 is configured to transmit and receive events, messages, commands or any other suitable data or signal between the central controller 102 and each of the individual EGMs 100. In some embodiments, one or more of the functions of the central controller 102 may be performed by one or more EGM processors. Moreover, in some embodiments, one or more of the functions of one or more EGM processors as disclosed herein may be performed by the central controller 102.

A wireless access point 106 provides wireless access to the data communication network 104. The wireless access point 106 may be connected to the data communication network 104 as illustrated in FIG. 1, or may be connected directly to the central controller 102 or another server connected to the data communication network 104.

A player tracking server 108 may also be connected through the data communication network 104. The player tracking server 108 may manage a player tracking account that tracks the player's gameplay and spending and/or other player preferences and customizations, manages loyalty awards for the player, manages funds deposited or advanced on behalf of the player, and other functions. Player information managed by the player tracking server 108 may be stored in a player information database 110.

As further illustrated in FIG. 1, a mixed reality viewer 200, or augmented reality (AR) viewer, is provided. The mixed reality viewer 200 communicates with one or more elements of the system 10 to render two dimensional (2D) and/or three dimensional (3D) content to a player of one of the EGMs 100 in a virtual space, while at the same time allowing the player to see objects in the real space around the player. That is, the mixed reality viewer 200 combines a virtual image with real images perceived by the user, including images of real objects as well as images displayed by the EGM 100. In this manner, the mixed reality viewer 200 "mixes" real and virtual reality into a single viewing experience for the player. In some embodiments, the mixed reality viewer 200 may be further configured to enable the player to interact with both the real and virtual objects displayed to the player by the mixed reality viewer 200.

The mixed reality viewer 200 communicates with one or more elements of the system 10 to coordinate the rendering of mixed reality images, and in some embodiments mixed reality 3D images, to the player. For example, in some embodiments, the mixed reality viewer 200 may communicate directly with an EGM 100 over a wireless interface 112, which may be a WiFi link, a Bluetooth link, an NFC link, etc. In other embodiments, the mixed reality viewer 200 may communicate with the data communication network 104 (and devices connected thereto, including EGMs) over a wireless interface 113 with the wireless access point 106. The wireless interface 113 may include a WiFi link, a Bluetooth link, an NFC link, etc. In still further embodiments, the mixed reality viewer 200 may communicate simultaneously with both the EGM 100 over the wireless interface 112 and the wireless access point 106 over the wireless interface 113. In these embodiments, the wireless interface 112 and the wireless interface 113 may use different communication protocols and/or different communication resources, such as different frequencies, time slots, spreading codes, etc. For example, in some embodiments, the wireless interface 112 may be a Bluetooth link, while the wireless interface 113 may be a WiFi link.

The wireless interfaces 112, 113 allow the mixed reality viewer 200 to coordinate the generation and rendering of mixed reality images to the player via the mixed reality viewer 200.

In some embodiments, the gaming system 10 includes a mixed reality controller, or AR controller 114. The AR controller 114 may be a computing system that communicates through the data communication network 104 with the EGMs 100 and the mixed reality viewers 200 to coordinate the generation and rendering of virtual images to one or more players using the mixed reality viewers 200. The AR controller 114 may be implemented within or separately from the central controller 102.

In some embodiments, the AR controller 114 may coordinate the generation and display of the virtual images of the same virtual object to more than one player by more than one mixed reality viewer 200. As described in more detail below, this may enable multiple players to interact with the same virtual object together in real time. This feature can be used to provide a shared multiplayer experience to multiple players at the same time.

Moreover, in some embodiments, the AR controller 114 may coordinate the generation and display of the same virtual object to players at different physical locations, as will be described in more detail below.

The AR controller 114 may store a three dimensional wireframe map of a gaming area, such as a casino floor, and may provide the three dimensional wireframe map to the mixed reality viewers 200. The wireframe map may store various information about EGMs in the gaming area, such as the identity, type and location of various types of EGMs. The three dimensional wireframe map may enable a mixed reality viewer 200 to more quickly and accurately determine its position and/or orientation within the gaming area, and also may enable the mixed reality viewer 200 to assist the player in navigating the gaming area while using the mixed reality viewer 200. The generation of three dimensional wireframe maps is described in more detail below.

In some embodiments, at least some processing of virtual images and/or objects that are rendered by the mixed reality viewers 200 may be performed by the AR controller 114, thereby offloading at least some processing requirements from the mixed reality viewers 200.

A back bet server 116 may be provided to manage back bets placed using a mixed reality viewer 200 as described in more detail below. A mixed reality viewer 200 may communicate with the back bet server 116 through the wireless interface 113 and network 104.

Referring to FIGS. 2A to 2D, the mixed reality viewer 200 may be implemented in a number of different ways. For example, referring to FIG. 2A. in some embodiments, a mixed reality viewer 200A may be implemented as a 3D headset including a pair of semitransparent lenses 218 on which images of virtual objects may be displayed. Different stereoscopic images may be displayed on the lenses 218 to create an appearance of depth, while the semitransparent nature of the lenses 218 allow the user to see both the real world as well as the 3D image rendered on the lenses 218. The mixed reality viewer 200A may be implemented, for example, using a Hololens™ from Microsoft Corporation. The Microsoft Hololens includes a plurality of cameras and other sensors 220 that the device uses to obtain a live video signal for building a 3D model of the space around the user. The device 200A can generate a 3D image to display to the user that takes into account the real world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audially with the device.

Figure 2A:
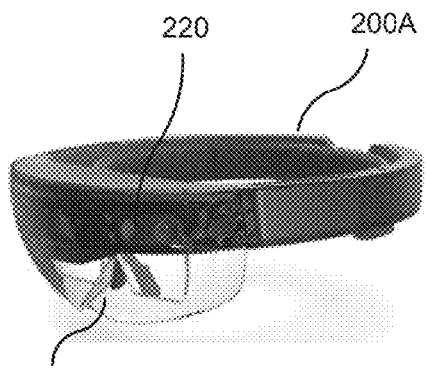
FIGS. 2A to 2D illustrate mixed reality viewers according to various embodiments.
Figure 2B:
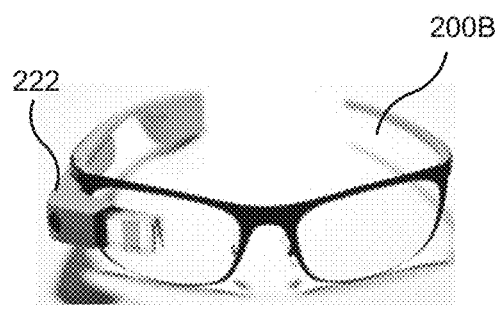

Referring to FIG. 2B, a mixed reality viewer 200B may be implemented as a pair of glasses including a transparent prismatic display 222 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
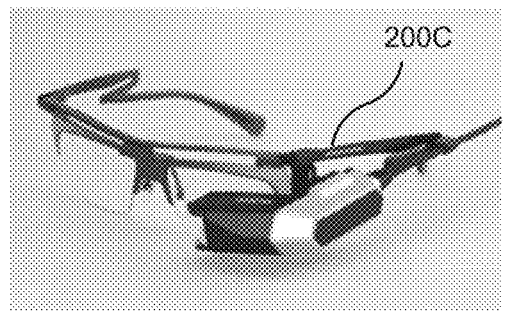
Figure 2D:
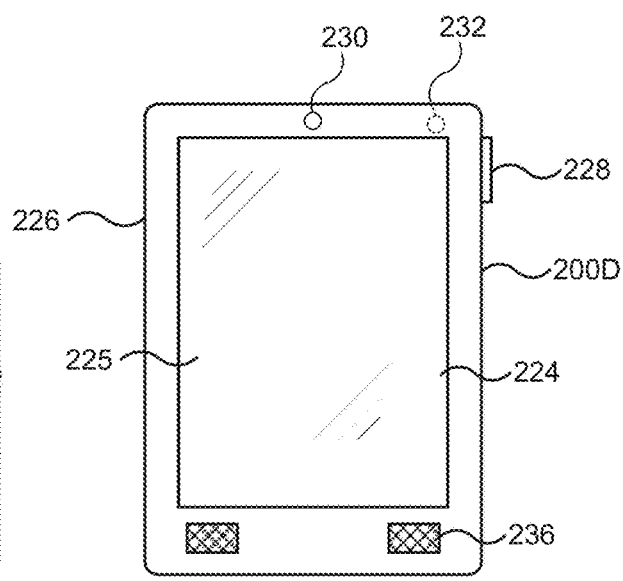

In other embodiments, referring to FIG. 2C, the mixed reality viewer may be implemented using a virtual retinal display device 200C. In contrast to devices that display an image within the field of view of the user, a virtual retinal display raster scans an image directly onto the retina of the user. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, a mixed reality viewer 200D may be implemented using a mobile wireless device, such as a mobile telephone, a tablet computing device, a personal digital assistant, or the like. The device 200D may be a handheld device including a housing 226 on which a touchscreen display device 224 including a digitizer 225 is provided. An input button 228 may be provided on the housing and may act as a power or control button. A rear facing camera 230 may be provided in a front face of the housing 226. The device 200D may further include a front facing camera 232 on a rear face of the housing 226. The device 200D may include one or more speakers 236 and a microphone 234. The device 200D may provide a mixed reality display by capturing a video signal using the front facing camera 232 and displaying the video signal on the display device 224, and also displaying a rendered image of a virtual object over the captured video signal. In this manner, the user may see both a mixed image of both a real object in front of the device 200D as well as a virtual object superimposed over the real object to provide a mixed reality viewing experience.

Figure 3A:
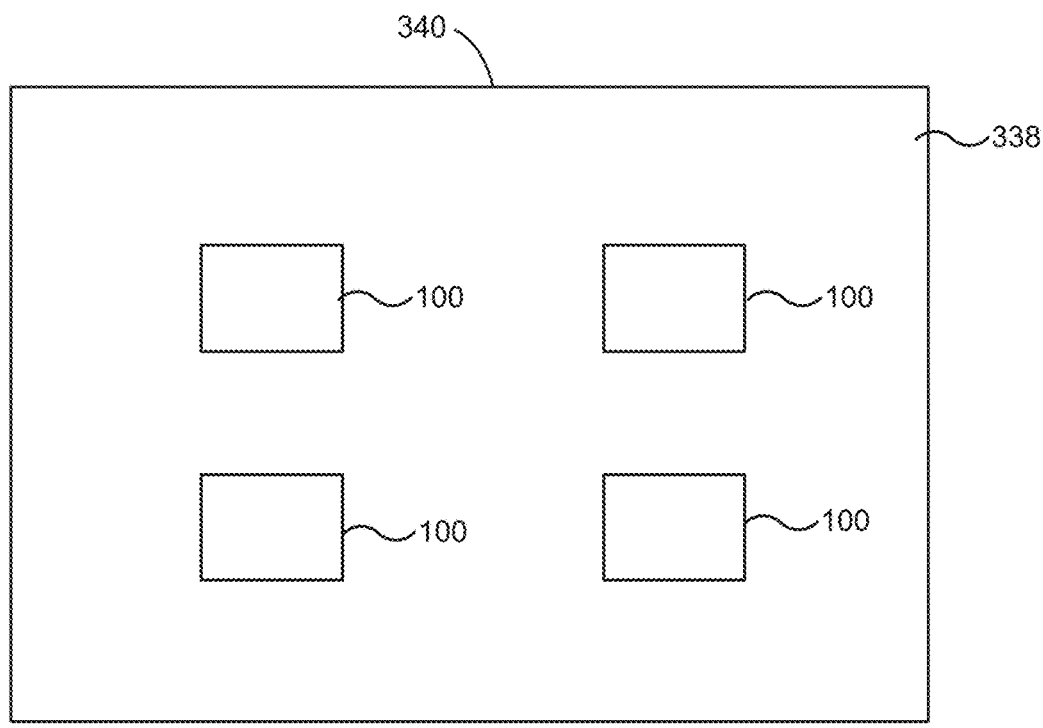
FIG. 3A is a map of a gaming area, such as a casino floor.

FIG. 3A illustrates, in plan view, an example map 338 of a gaming area 340. The gaming area 340 may, for example, be a casino floor. The map 338 shows the location of a plurality of EGMs 100 within the gaming area 340. As will be appreciated, the locations of the EGMs 100 within a gaming area 340 are generally fixed, although a casino operator may relocate EGMs from time to time, such as when new EGMs are introduced, to create new traffic flow patterns within the gaming area 340, to feature or highlight certain games, etc. As noted above, in order to assist the operation of the mixed reality viewers 200, the AR controller 114 may store a three dimensional wireframe map of the gaming area 340, and may provide the three dimensional wireframe map to the mixed reality viewers 200. In some embodiments, the three dimensional wireframe map may be generated dynamically, such as by surveying the gaming area 340 with the mixed reality viewers 200 in real time to build a wireframe model for the three dimensional wireframe map.

Figure 3B:
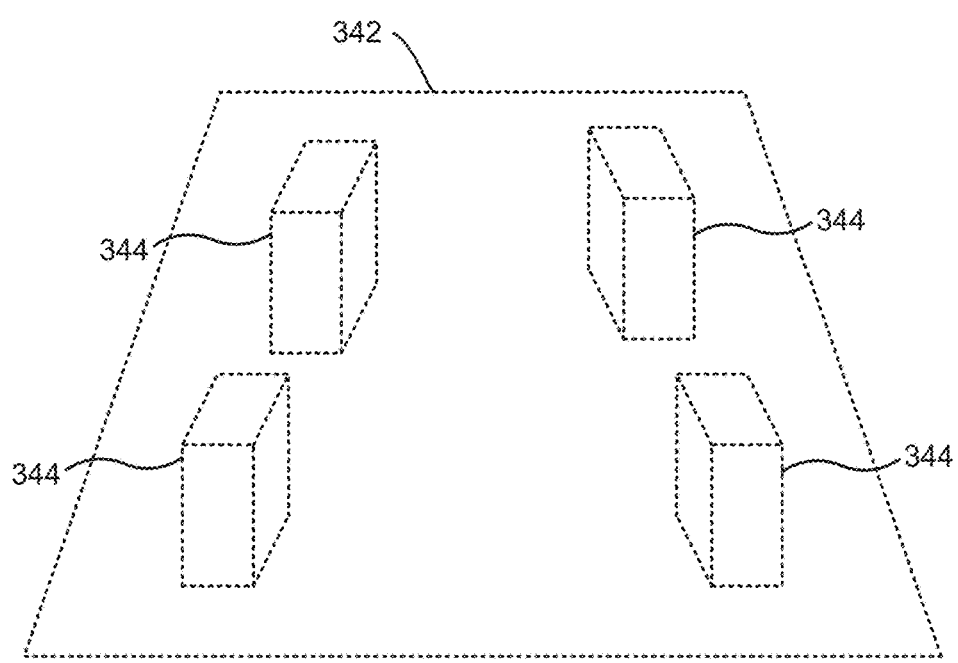
FIG. 3B is a three-dimensional (3) D wireframe model of the gaming area of FIG. 3A.

An example of a wireframe map 342 is shown in FIG. 3B. The wireframe map 342 is a three-dimensional model of the gaming area 340. As shown in FIG. 3B, the wireframe map 342 includes wireframe models 344 corresponding to the EGMs 100 that are physically in the gaming area 340. The wireframe models 344 may be pregenerated to correspond to various EGM form factors, such as single display EGMs, mechanical slot EGMs, dual display EGMs, etc. The pregenerated models may then be placed into the wireframe map, for example, by a designer or other personnel. The wireframe map 342 may be updated whenever the physical location of EGMs in the gaming area 340 is changed.

In some embodiments, the wireframe map 342 may be generated automatically using a mixed reality viewer 200, such as a 3D headset, that is configured to perform a three-dimensional depth scan of its surroundings and generate a three dimensional model based on the scan results. Thus, for example, an operator using a mixed reality viewer 200A (FIG. 2A) may perform a walkthrough of the gaming area 340 while the mixed reality viewer 200A builds the 3D map of the gaming area.

The three dimensional wireframe map 342 may enable a mixed reality viewer 200 to more quickly and accurately determine its position and/or orientation within the gaming area. For example, a mixed reality viewer 200 may determine its location within the gaming area 340 using one or more position/orientation sensors. The mixed reality viewer 200 then builds a three dimensional map of its surroundings using depth scanning, and compares its sensed location relative to objects within the generated three dimensional map with an expected location based on the location of corresponding objects within the wireframe map 342. The mixed reality viewer 200 may calibrate or refine its position/orientation determination by comparing the sensed position of objects with the expected position of objects based on the wireframe map 342. Moreover, because the mixed reality viewer 200 has access to the wireframe map 342 of the entire gaming area 340, the mixed reality viewer 200 can be aware of objects or destinations within the gaming area 340 that it has not itself scanned. Processing requirements on the mixed reality viewer 200 may also be reduced because the wireframe map 342 is already available to the mixed reality viewer 200.

In some embodiments, the wireframe map 342 may store various information about EGMs in the gaming area, such as the identity, type, orientation and location of various types of EGMs, the locations of exits, bathrooms, courtesy desks, cashiers, ATMs, ticket redemption machines, etc. Such information may be used by a mixed reality viewer 200 to help the user navigate the gaming area. For example, if a user desires to find a destination within the gaming area, the user may ask the mixed reality viewer 200 for directions using a built-in microphone and voice recognition function in the mixed reality viewer 200 or use other hand gestures or eye/gaze controls tracked by the mixed reality viewer 200 (instead of or in addition to voice control). The mixed reality viewer 200 may process the request to identify the destination, and then may display a virtual object, such as a virtual path on the ground, virtual arrow, virtual sign, etc., to help the user to find the destination. In some embodiments, for example, the mixed reality viewer 200 may display a halo or glow around the destination to highlight it for the user, or have virtual 3D sounds coming from it so players could more easily find the machine.

According to some embodiments, a user of a mixed reality viewer 200 may use the mixed reality viewer to obtain information about players and/or EGMs on a casino gaming floor. The information may be displayed to the user on the mixed reality viewer 200 in a number of different ways such as by displaying images on the mixed reality viewer 200 that appear to be three dimensional or two dimensional elements of the scene as viewed through the mixed reality viewer 200. In general, the type and/or amount of data that is displayed to the user may depend on what type of user is using the mixed reality viewer 200 and, correspondingly, what level of permissions or access the user has. For example, a mixed reality viewer 200 may be operated in one of a number of modes, such as a player mode, an observer mode or an operator mode. In a player mode, the mixed reality viewer 200 may be used to display information about particular EGMs on a casino floor. The information may be generic information about an EGM or may be customized information about the EGM based on the identity or preferences of the user of the mixed reality viewer 200. In an observer mode, the mixed reality viewer 200 may be used to display information about particular EGMs on a casino floor or information about players of EGMs on the casino floor. In an operator mode, the mixed reality viewer 200 may also be used to display information about particular EGMs on a casino floor or information about players of EGMs on the casino floor, but the information may be different or more extensive than the information displayed to an observer. Each of these situations is described in more detail below.

Figure 4A:
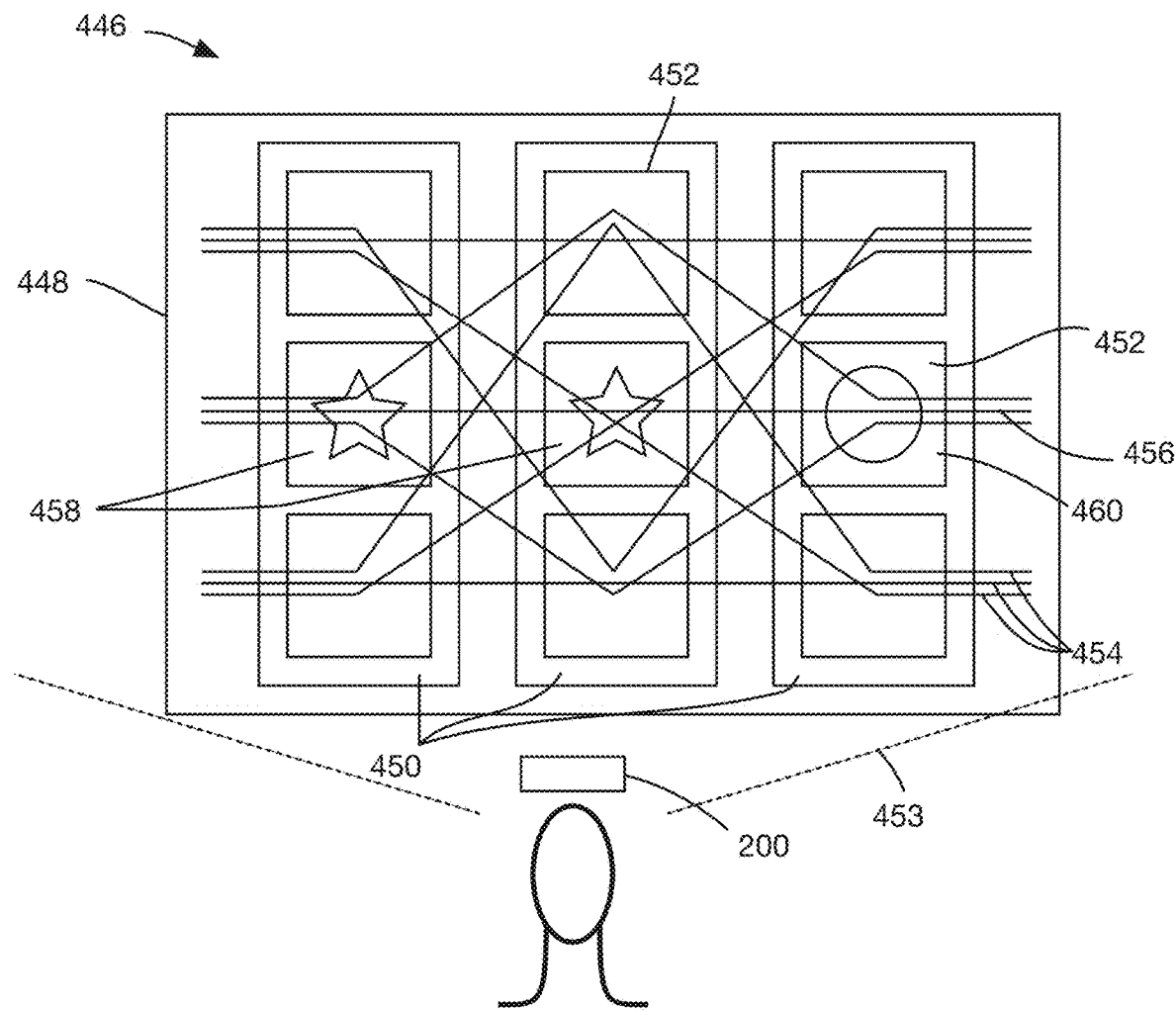
FIGS. 4A and 4B illustrate a mixed reality interface for an EGM similar to the EGM of FIGS. 1-3B, including a virtual reel symbol overlaying a reel symbol displayed by the EGM.
Figure 4B:
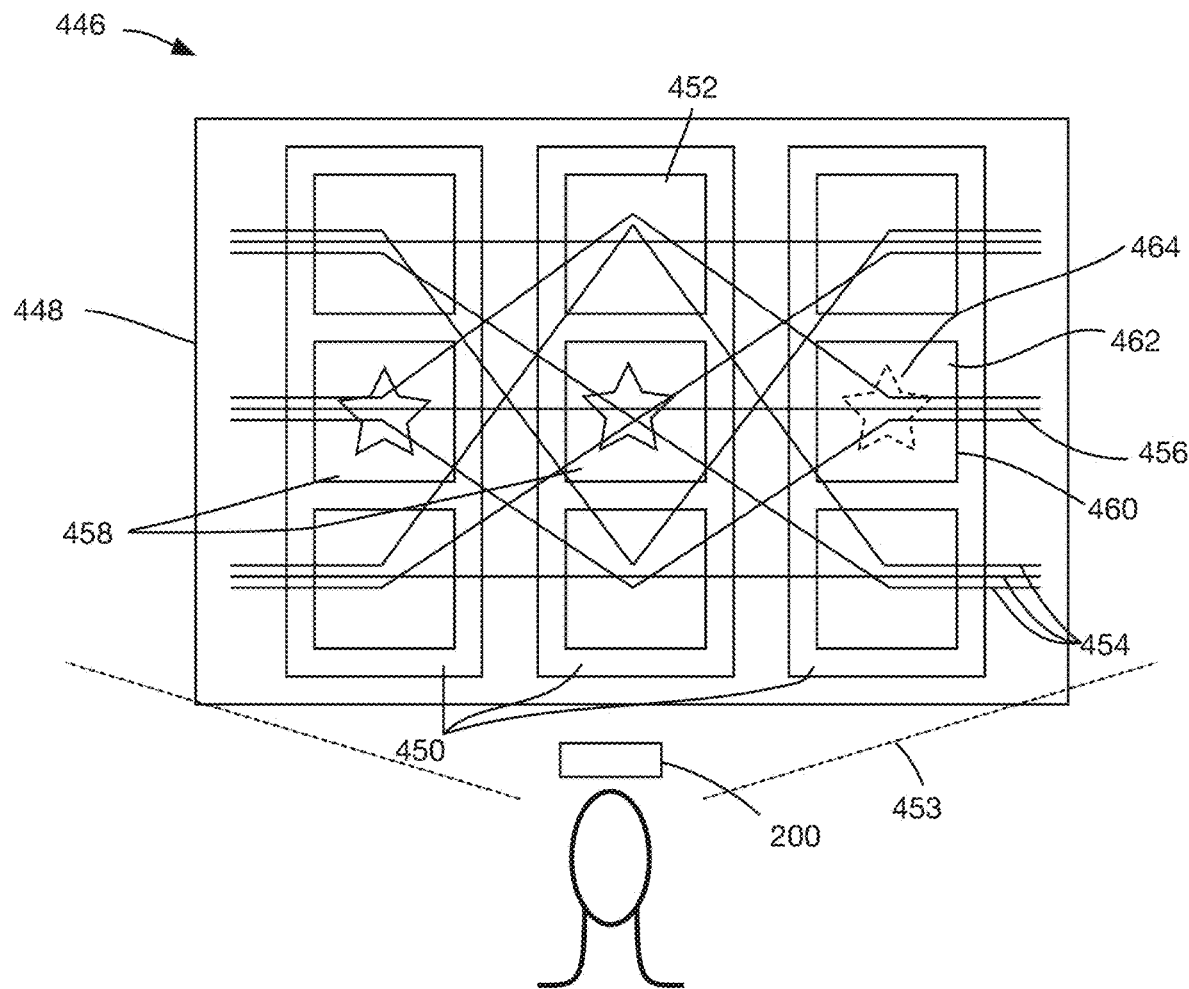

Referring now to FIGS. 4A and 4B, a mixed reality interface 446 for an EGM 100 is illustrated. In FIG. 4A, an EGM interface 448 for a casino-style slot game includes a plurality of real or graphically animated reels 450, with each reel 450 having a plurality of different game symbols 452. During play of the base game, the user activates a spin function to cause the reels 450 to spin and arrange the symbols 452 randomly or semi-randomly in an array. A plurality of paylines 454 extend across the reels 450 in different patterns, with different combinations of symbols 452 across different paylines 454 corresponding to different game outcomes, including winning game outcomes. Each winning game outcome may have an associated game award that is provided to the user. The game award may include a monetary award, such as real or virtual currency, casino credit, or other currency-based award, or may be a non-monetary award, such as an increase in player status or increased odds on future gaming activity by the user, for example. It should be understood that, while the base game in this embodiment is a casino-style slot game, other base games are contemplated, such as, for example, video poker games, skill-based games, electronic and/or virtual casino-style table games, sports and race betting, or other casino or non-casino style games, as desired.

As shown in FIG. 4A, a first payline 456 for the EGM interface 448 has two matching symbols 458 and a non-matching symbol 460 along the first payline 456, indicating a non-winning outcome. In FIG. 4B, however, a user viewing the mixed reality interface 446 through a mixed reality viewer 200 may see one or more virtual symbols 462 overlaying one or more particular symbols 452 being displayed by the EGM interface 448, so that the virtual symbol 462 replaces the respective symbols 452 in the user's field of view 453. In this example, a virtual matching symbol 466 in FIG. 4B overlays and replaces the non-matching symbol 460 in the first payline 456 of the EGM interface 448, so that the virtual matching symbol 462 appears to be a game symbol 452 on the slot reel 450 that forms a regular pattern on the slot reels 450, replacing the non-matching symbol 460 within the scene. In this example, replacing the non-matching symbol 460 with the virtual matching symbol 462 may change the result of the first payline 456 from a non-winning outcome in the EGM interface 448 that does not include the virtual matching symbol 462 to a winning outcome in the mixed reality interface 446 that does include the virtual matching symbol 462, with the mixed reality interface 446 indicating that the new outcome is a winning outcome.

Figure 5A:
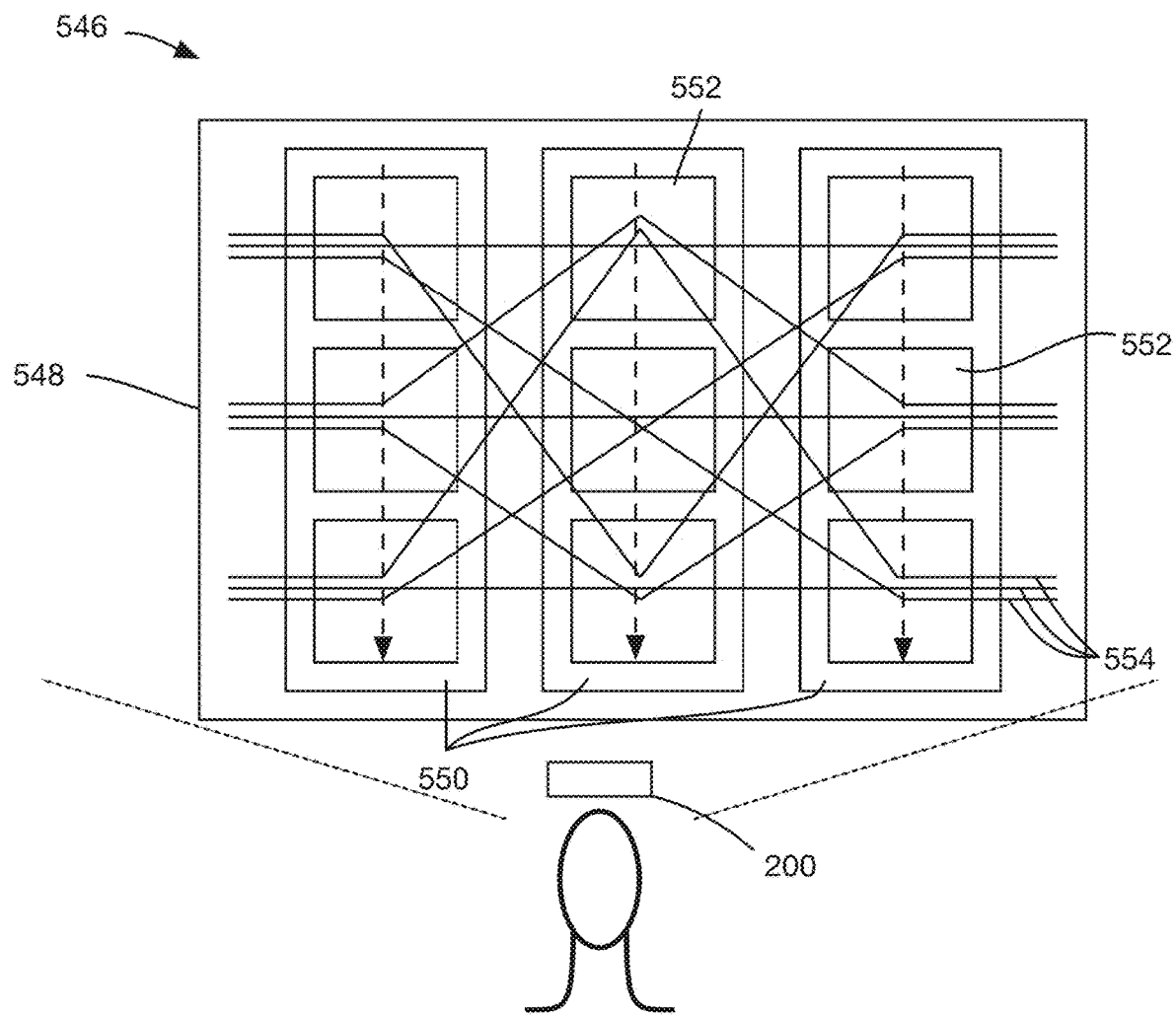
FIGS. 5A and 5B illustrate a mixed reality interface for an EGM including a virtual reel overlaying a reel displayed by the EGM.
Figure 5B:
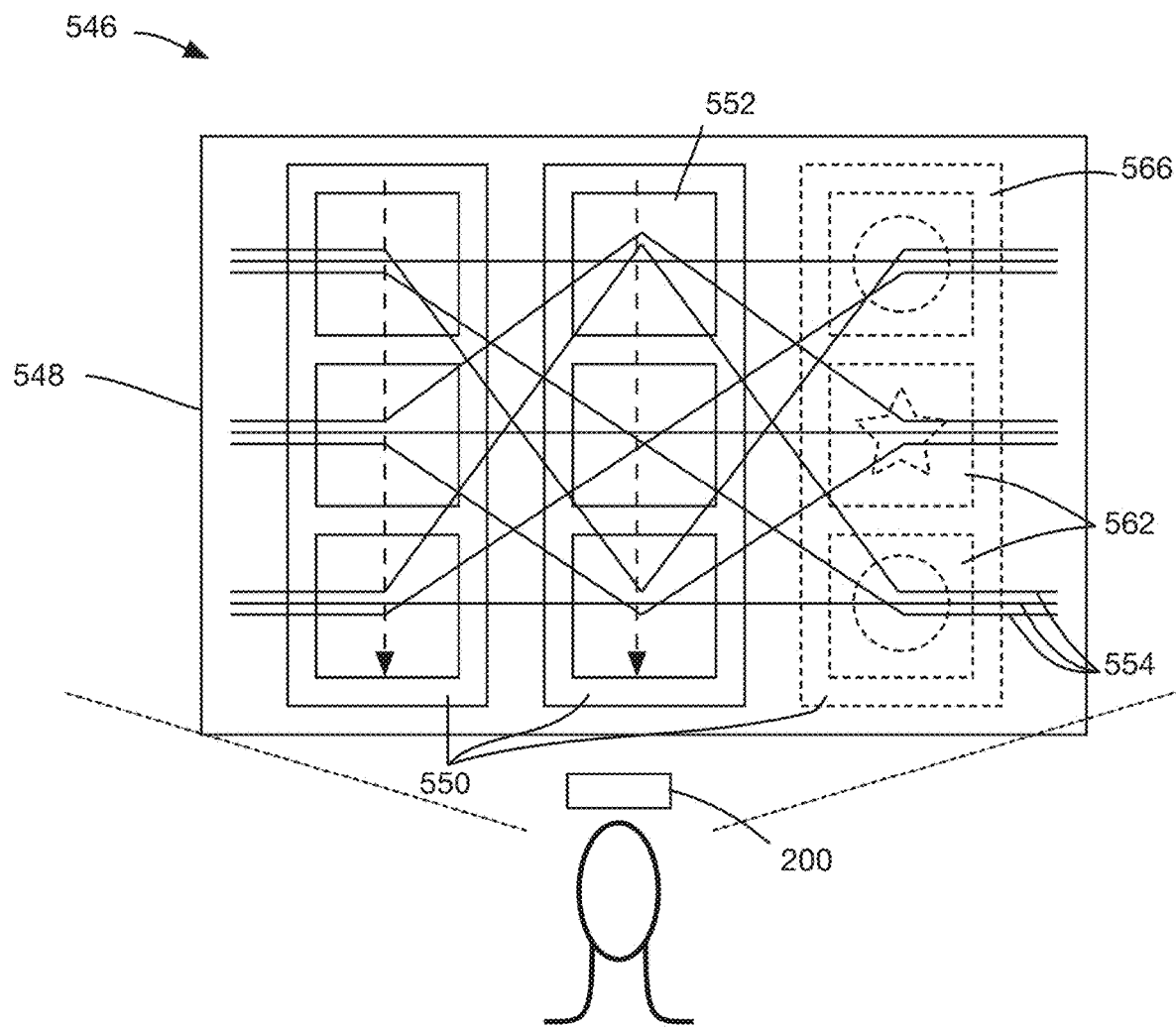

In another example, FIGS. 5A and 5B illustrate a mixed reality interface 546 in which one or more virtual reels 566 replaces one or more respective reels 550 of the EGM interface 548. In this example, all three reels 550 of the EGM interface 548 of FIG. 5A rotate to randomly generate an array of symbols 552. In FIG. 5B, however, one or more virtual reels 566 may overlay one or more respective reels 550 of the EGM interface 548 to replace the respective reels 550 in the mixed reality interface 546. In this example, the virtual reel 566 is "locked" in place, i.e., does not spin, thereby determining a plurality of virtual symbols 562 for that reel before the reels 550 of the EGM interface 548 have stopped spinning. In some embodiments, the virtual symbols 562 may be favorable symbols that are more likely to result in a winning outcome for one or more paylines 554. In some embodiments, the virtual symbols 562 may also be symbols that are not available on the reels 550 of the EGM interface 548, so that a player viewing the mixed reality interface 546 may have a more favorable odds and/or outcomes than the odds and/or outcomes available using the EGM interface 548 alone. In this manner, the mixed reality interface 546 can achieve a number of effects, including overlaying a plurality of primary game symbols of a particular slot reel with a plurality of virtual game symbols at a particular time while the slot reels are spinning during play of the wagering game, with the plurality of virtual game symbols corresponding to the plurality of primary game symbols of the particular slot reel being displayed at the particular time, so that the slot reel appears to stop spinning while other slot reels of the plurality of slot reels continue to spin.

Figure 6A:
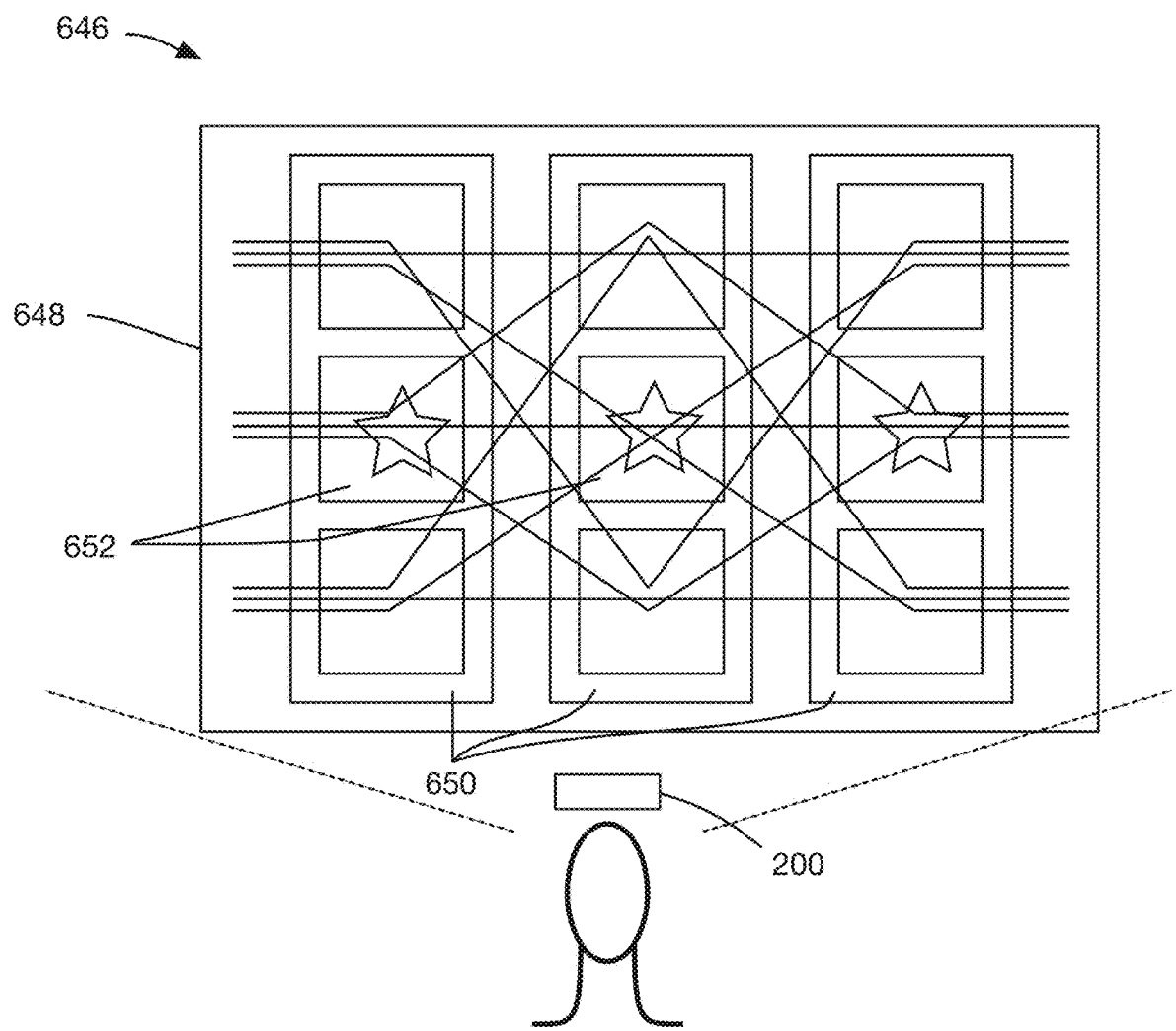
FIGS. 6A and 6B illustrate a mixed reality interface for an EGM including an animated virtual reel symbol overlaying a static reel symbol displayed by the EGM.
Figure 6B:
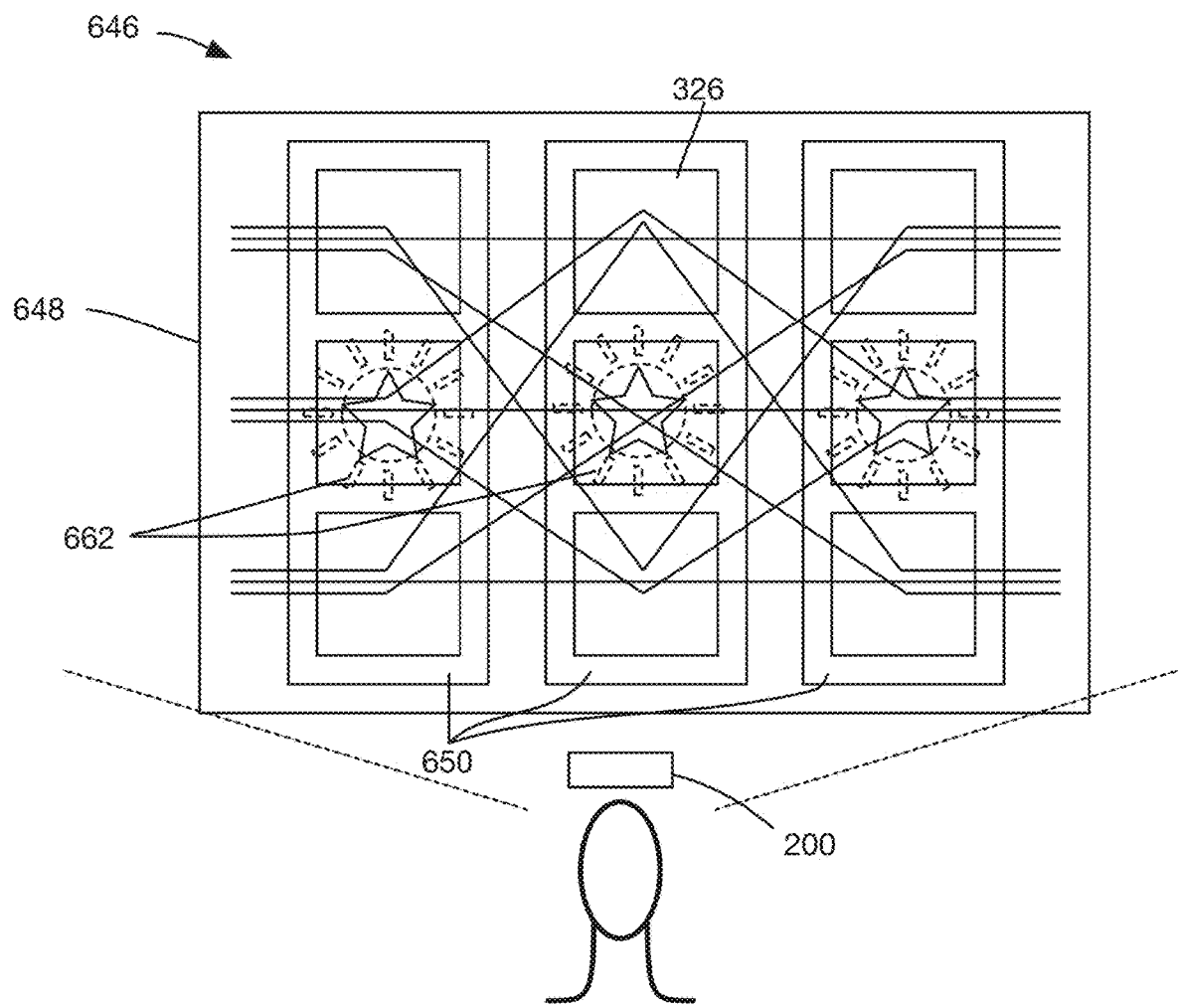

In another example, FIGS. 6A and 6B illustrate a mixed reality interface 646 in which one or more animated virtual symbols 662 replaces one or more respective static symbols 652 of the EGM interface 648. In this example, FIG. 6A illustrates that the symbols 652 on the reels 650 of the EGM interface 648 are static symbols, e.g., real or simulated printed graphics on the respective reels 650. As shown in FIG. 6B, however, a user viewing the mixed reality interface 646 may instead see virtual symbols 662 that are animated versions of the static symbols 652 of the EGM interface 648. In this manner, the mixed reality interface 646 can achieve a number of effects, including animating a game symbol within the scene so that the game symbol appears to move with respect to the other game symbols, and overlaying the virtual game symbol over a particular static game symbol of the plurality of primary game symbols on one of the plurality of slot reels so that the virtual game symbol replaces the a particular static game symbol within the scene.

Figure 7A:
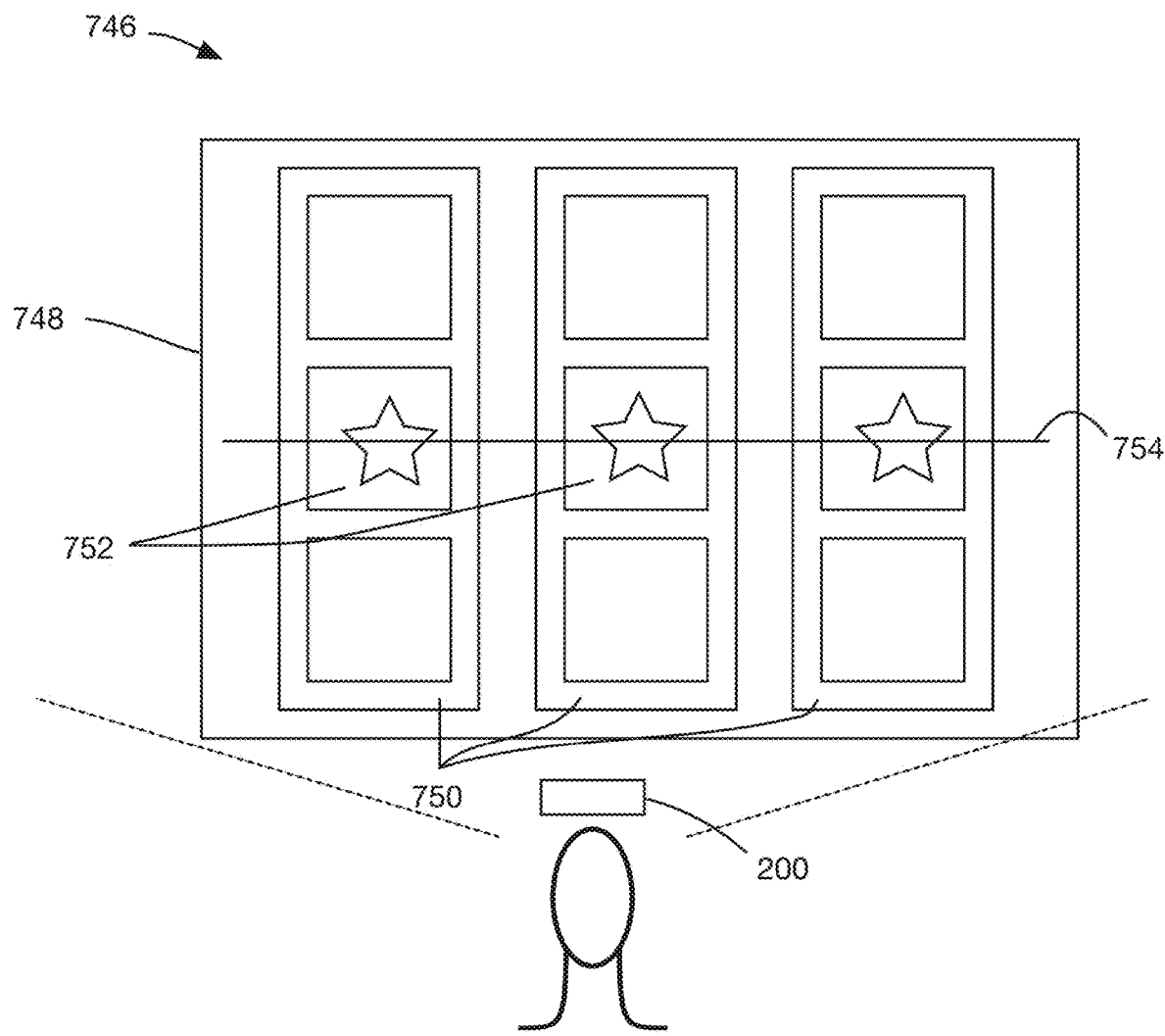
FIGS. 7A and 7B illustrate a mixed reality interface for an EGM including an animation overlaying portions of the reels displayed by the EGM.
Figure 7B:
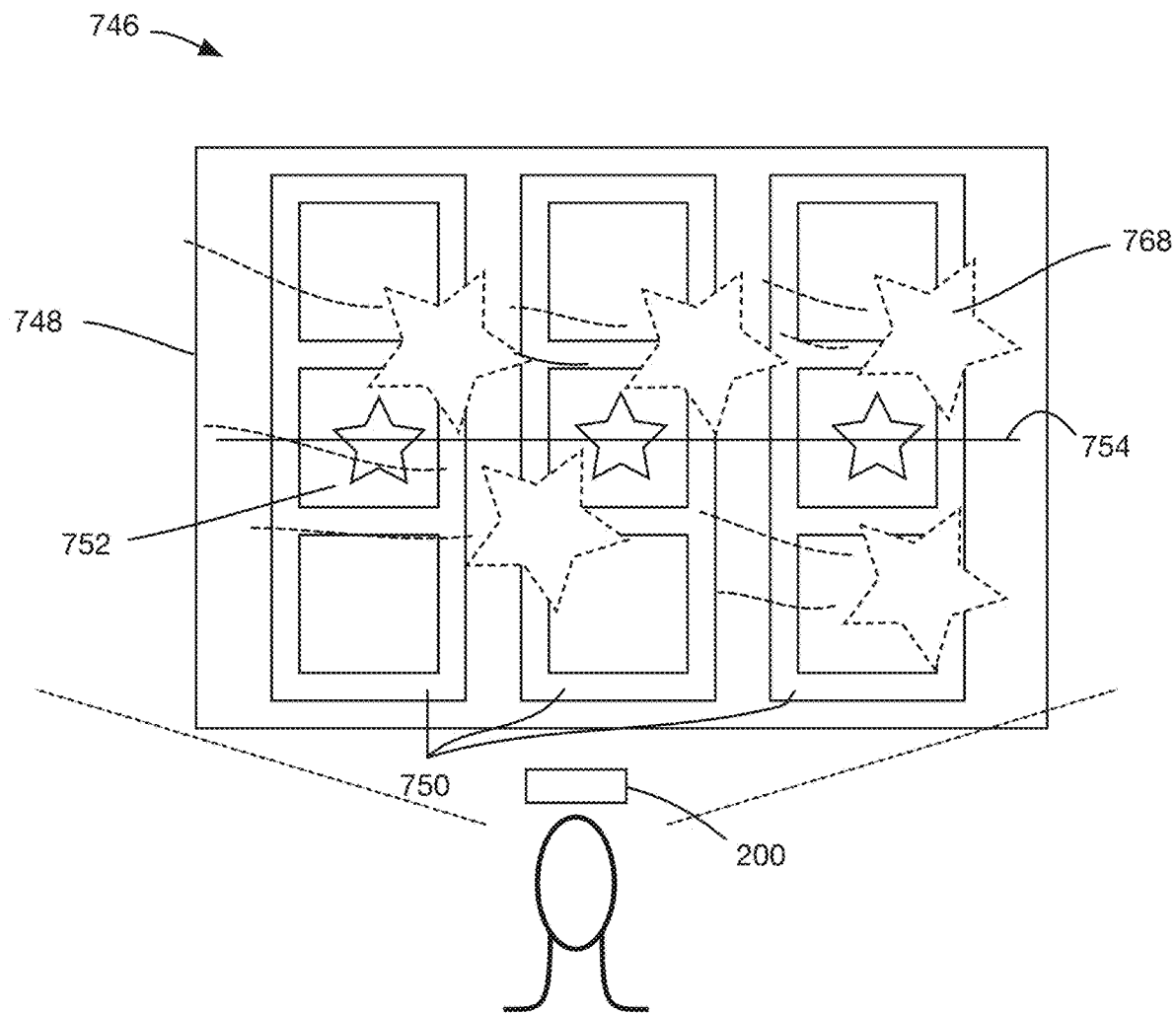

In another example, FIGS. 7A and 7B illustrate a mixed reality interface 746 in which an animation 768 or other graphic is displayed over all or a portion of one or more reels 750 of the EGM interface 748. In this example, FIG. 7A illustrates the EGM interface 748 with the symbols 752 along a payline 754 indicating a winning outcome. As shown in FIG. 7B, a user viewing the mixed reality interface 746 may see an animation 768, such as a shooting star animation for example, displayed over the reels 750 so that the animation appears to be moving across or interacting with the reels 750 and/or symbols 752 of the EGM interface 748. Other features may include skill-based games, features and/or animations, that may allow a user to change the result of the game by successfully completing a skill-based function. In this manner, the mixed reality interface 746 can achieve a number of effects, including overlaying a plurality of virtual game symbols over a subset of the plurality of slot reels, with the virtual game symbols animating to display an animation across the subset of the plurality of slot reels.

Figure 8:
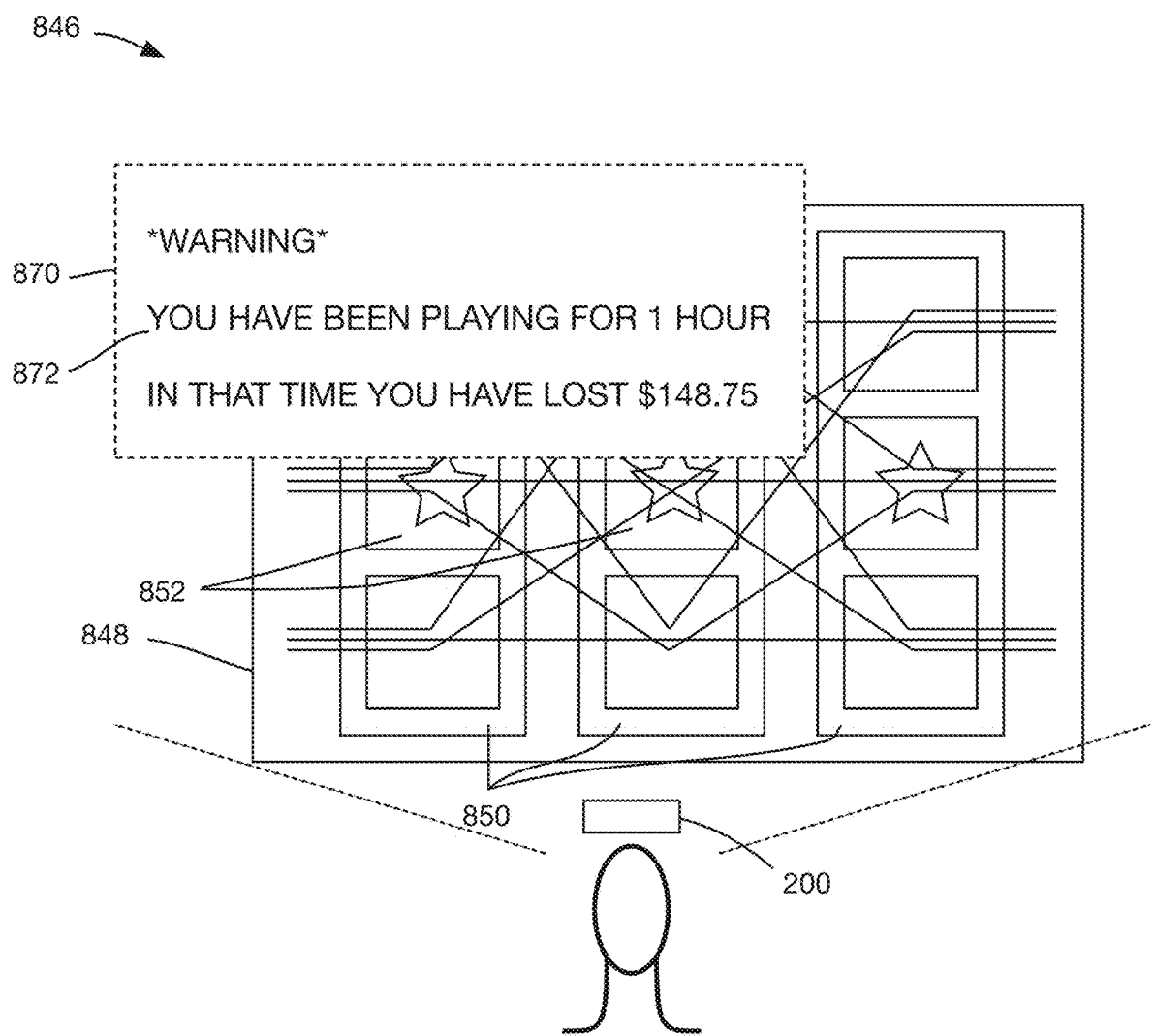
FIG. 8 illustrates a mixed reality interface for an EGM including a virtual player information display associated with game graphics displayed by the EGM and providing information to a user of the EGM.

It should be understood that other information may be provided via the mixed reality interfaces described herein. In this regard, FIG. 8 illustrates a mixed reality interface 846 including a virtual player information display 870. The virtual player information display 870 can appear alongside the EGM interface 848, or it can partially or completely overlay elements of the EGM interface 848, including reels 850 and/or symbols 852 of the EGM interface 848 for example. In this example, the player information display 870 may include information 872 about the player's play history, current or historic winnings and/or losses, or other information that may be useful to the player. For example, some jurisdictions require that a player be provided with an indication or alert if the player's losses exceed a predetermined threshold, and may also limit play in response to losses exceeding the threshold. In this example, the player's losses have exceeded the predetermined threshold and the player's play has been limited, as indicated by the player information display 870. Examples of limitations of play may include reducing a maximum bet amount, reducing the speed of play of the game, disabling auto-play and/or auto-spin features of the game, or other limitations. In this manner, the mixed reality interface 846 can achieve a number of effects, including displaying an information display element within the scene so that the information display element, comprising an indication of gambling losses by the user over a predetermined time period, is associated with the gaming device. The information display element may also, or alternatively, include an indication of gambling losses by the user over a predetermined time period, or a warning indication that indicates a limitation on play of the wagering game by the user, with the gaming device configured so that a rate of play of the wagering game by the user is reduced.

Figure 9:
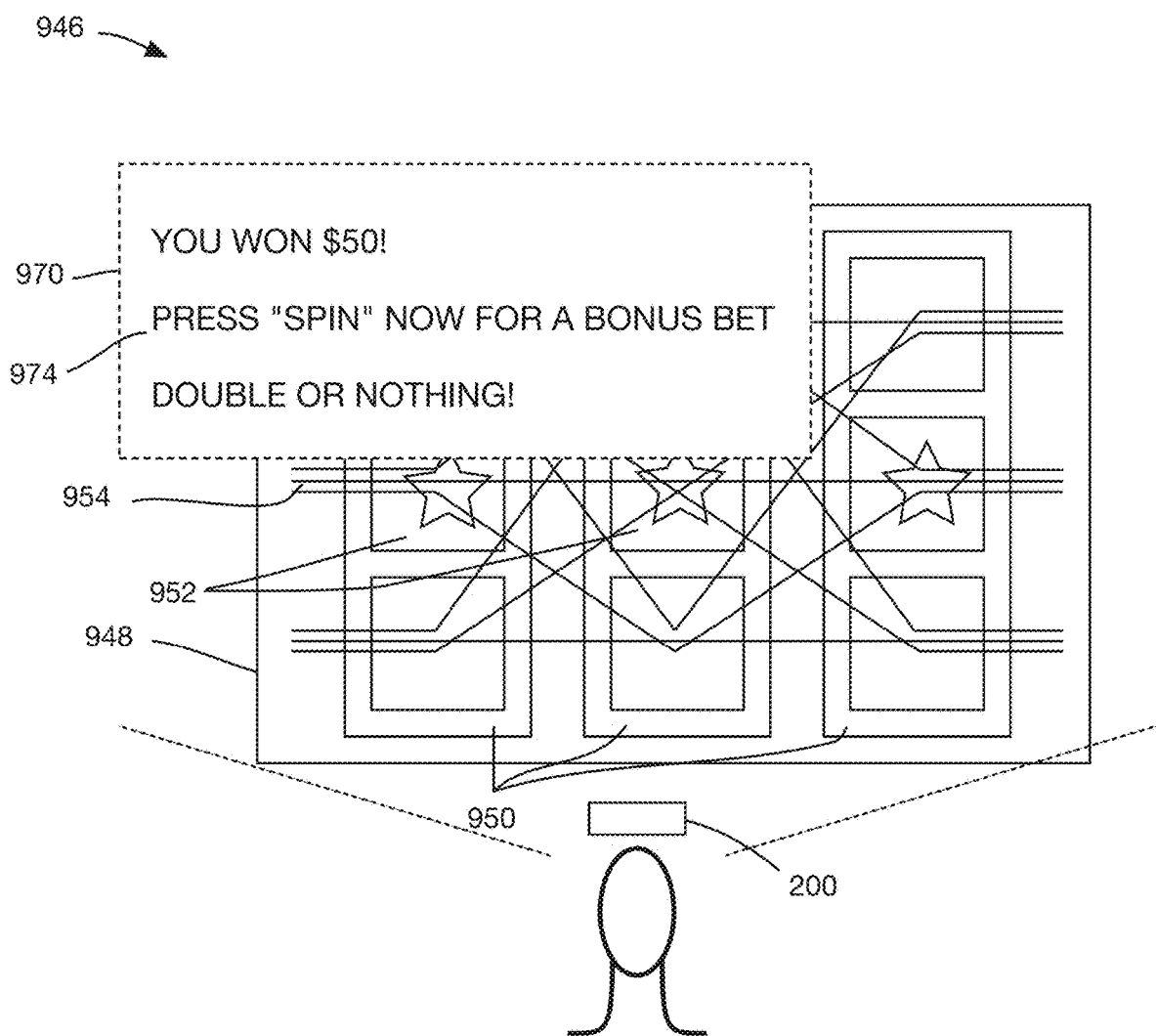
FIG. 9 illustrates a mixed reality interface for an EGM including a virtual player information display associated with game graphics displayed by the EGM and providing a bonus bet opportunity to a user of the EGM.

In another embodiment, FIG. 9 illustrates a mixed reality interface 946 that includes a bonus bet offer 974 offered to a player in response to a winning outcome displayed in the EGM interface 948. In response to a winning outcome in the EGM interface 948 on the reels 950, such as a plurality of matching symbols 952 along a payline 954, for example, a player viewing the mixed reality interface 946 may be presented with an offer for a bonus bet 974 in an information display 970. The bonus bet offer 974 in this example is a "double or nothing" offer, with the bonus bet wager amount equal to the payout for the previous winning outcome, and with the potential payout amount equal to twice the bonus bet wager amount. It should be understood, however, that other types of bonus bets and/or additional wagering opportunities may be presented via the mixed reality interface 946. In this manner, the mixed reality interface 946 can achieve a number of effects, including displaying an offer, e.g., a wager based on the payout, in response to the user winning a payout for the wagering game, such as a bonus bet equal to the payout, with a bonus payout equal to twice the bonus bet, for example.

Figure 10:
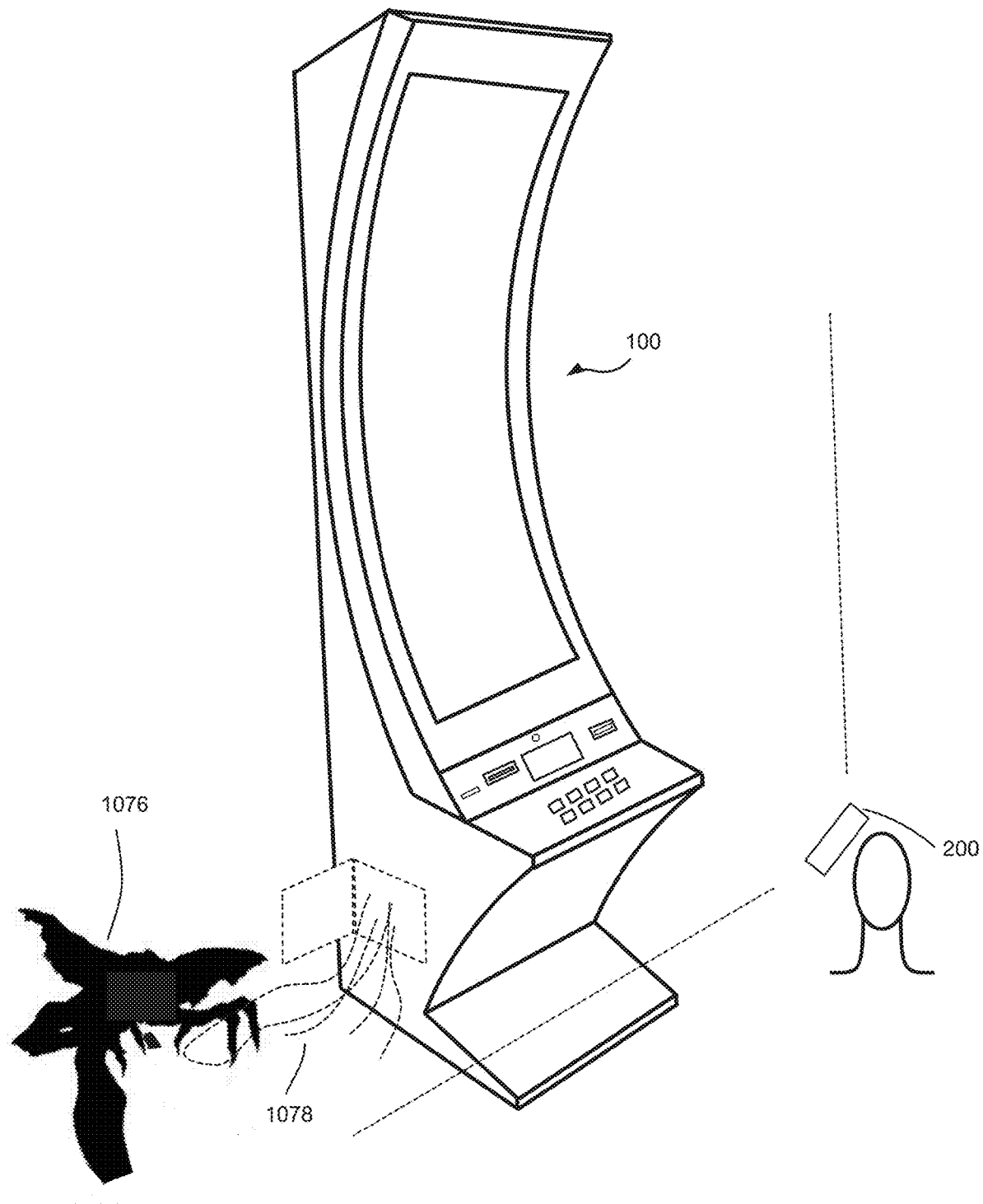
FIG. 10 illustrates a mixed reality interface for an EGM including an animation that appears to be a creature tampering with the EGM to change the odds and/or outcome of a game at the EGM.

In another example, FIG. 10 illustrates a mixed reality interface 1046 that may be used to indicate a change in odds or increased chance of winning to a player viewing the EGM 100 via a mixed reality viewer 200. In this example, the mixed reality interface 1046 includes a virtual creature 1076, such as a gremlin, that appears to be tampering with the EGM 100. The EGM 100 may appear to react to the simulated tampering by exhibiting indications 1078 of "malfunctioning" and offering increased odds or payouts to the player viewing the creature 1076 and resulting indications 1078 of malfunctioning. In other examples, the mixed reality interface may include virtual secondary game that appears to be adjacent to or coupled to the EGM 100 when viewed by the user through a mixed reality viewer 200. For example, the virtual secondary game could be a virtual mechanical pinball game, but it should be understood that other types of virtual secondary games may be used. In this manner, the mixed reality interface 1046 can achieve a number of effects, including displaying a creature as part of the scene so that the creature appears to be interacting with, e.g., damaging or tampering with, the gaming device, or displaying a virtual mechanical game, such as a virtual pinball machine or virtual topbox, to the user as part of the scene so that the virtual mechanical game appears to be part of the gaming device.

It should be understood that other features may be incorporated into mixed reality interfaces disclosed herein and other mixed reality interfaces. For example, virtual elements may be added to an EGM game, including additional virtual reels, a respin feature allowing a user to respin a virtual reel, a jitter, stutter or other visual change in the spinning of the reels, a multiplier feature for the user of the mixed reality interface that is not available to a player at the EGM interface alone, or one or more skill elements. Other features may include autohold or suggestions relating to the EGM game, e.g., showing a user a hint, such as which cards to hold or which items to select, a progressive to the game, such as a bank progressive or a wide area progressive, additional betting opportunities, such as additional paylines, a change in the theme of the game, including changing symbols, reels or other graphics and/or game sounds to change the theme, and market features, such as an autoplay function.

Figure 11:
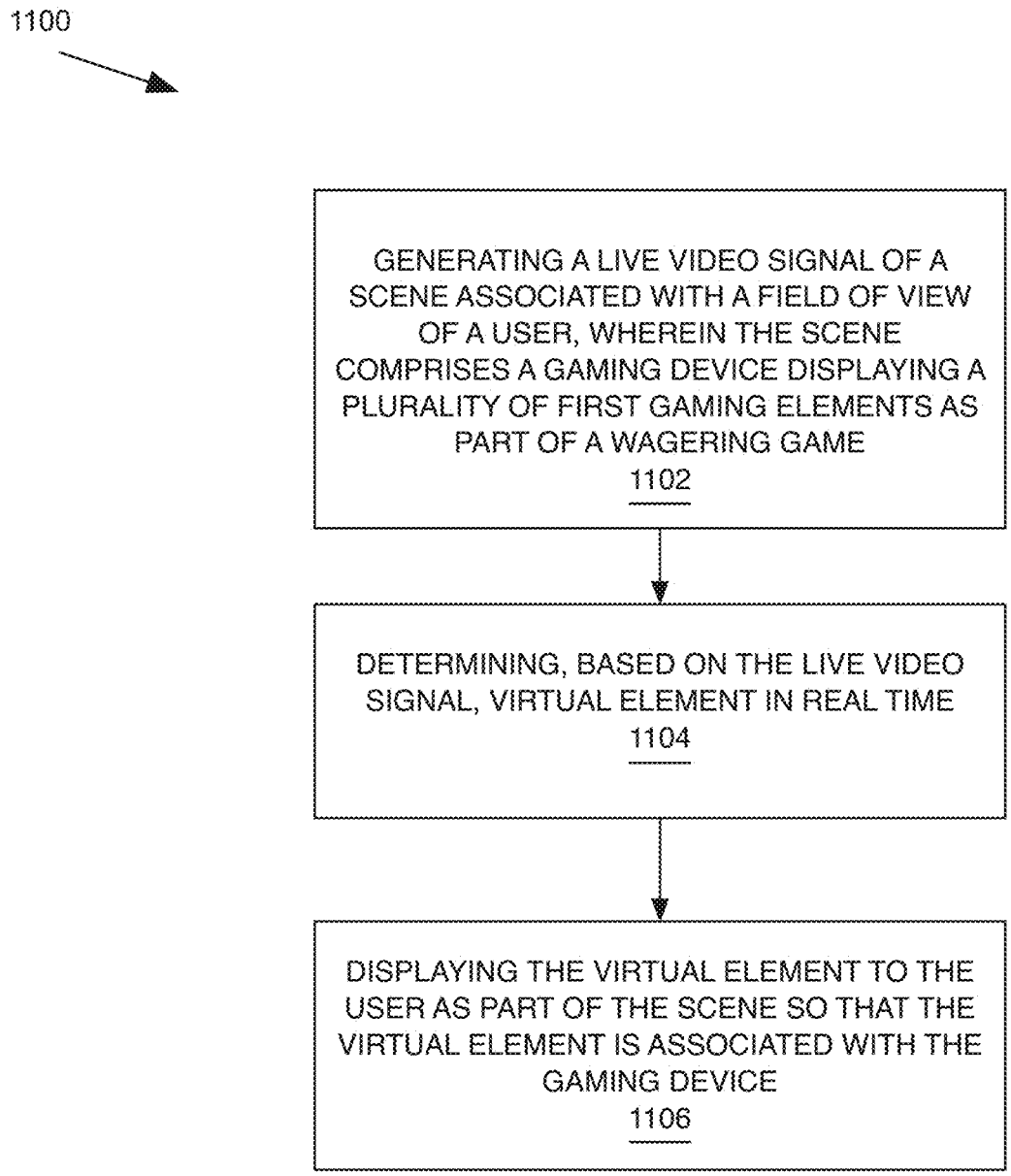
FIG. 11 is a flowchart illustrating operations of systems/methods according to some embodiments.

Referring now to FIG. 11, a flowchart diagram illustrates operations of a method 1100 according to some embodiments. The method 1100 includes generating a live video signal of a scene associated with a field of view of a user, wherein the scene comprises a gaming device displaying a plurality of first gaming elements as part of a wagering game (Block 1102). The method 1100 further includes determining, based on the live video signal, virtual element in real time (Block 1104). The method 1100 further includes displaying the virtual element to the user as part of the scene so that the virtual element is associated with the gaming device (Block 1106). It should be understood that other methods are contemplated, including methods having additional, fewer, or different operations.

Figure 12A:
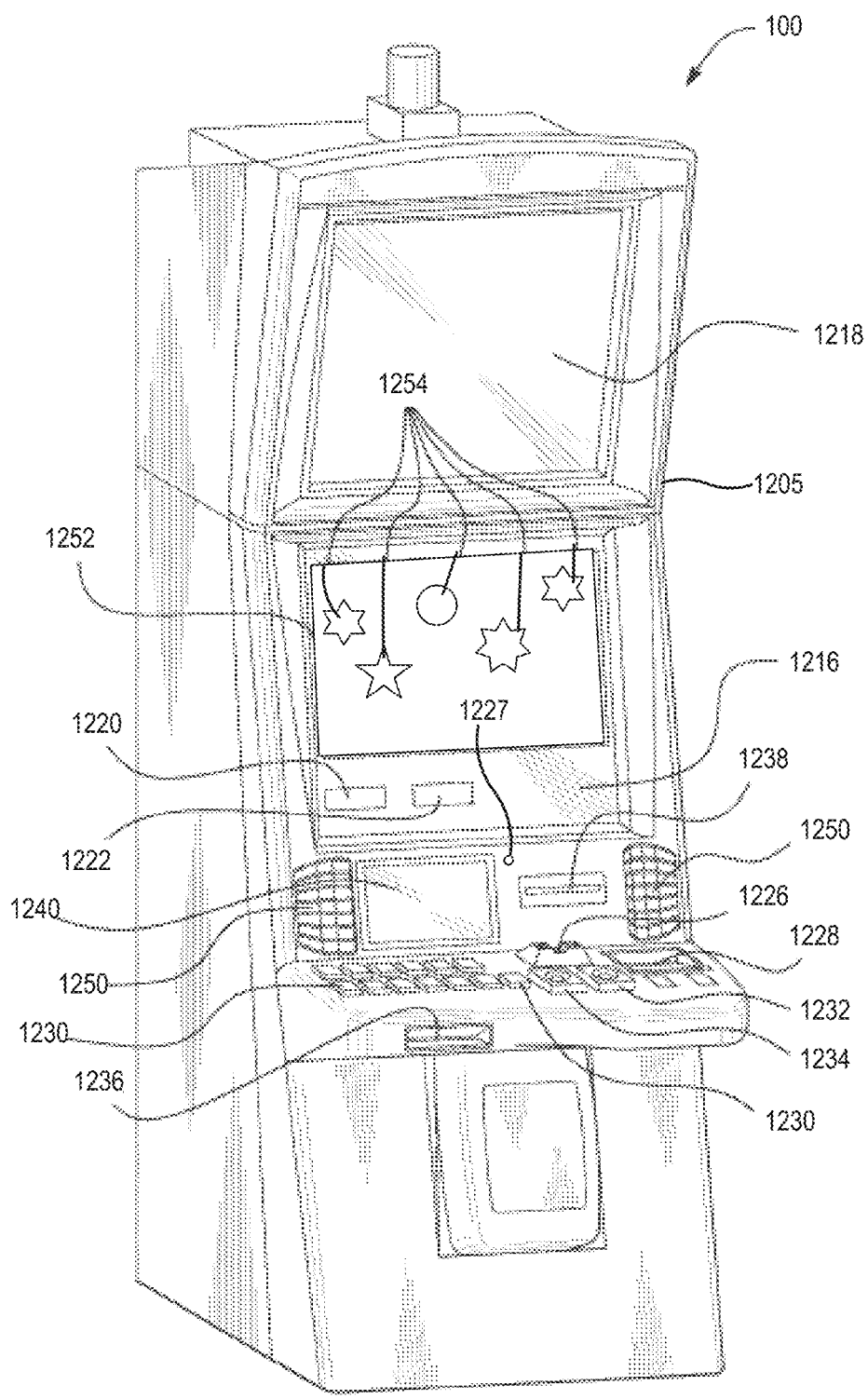
FIG. 12A is a perspective view of an electronic gaming device that can be configured according to some embodiments.
Figure 12B:
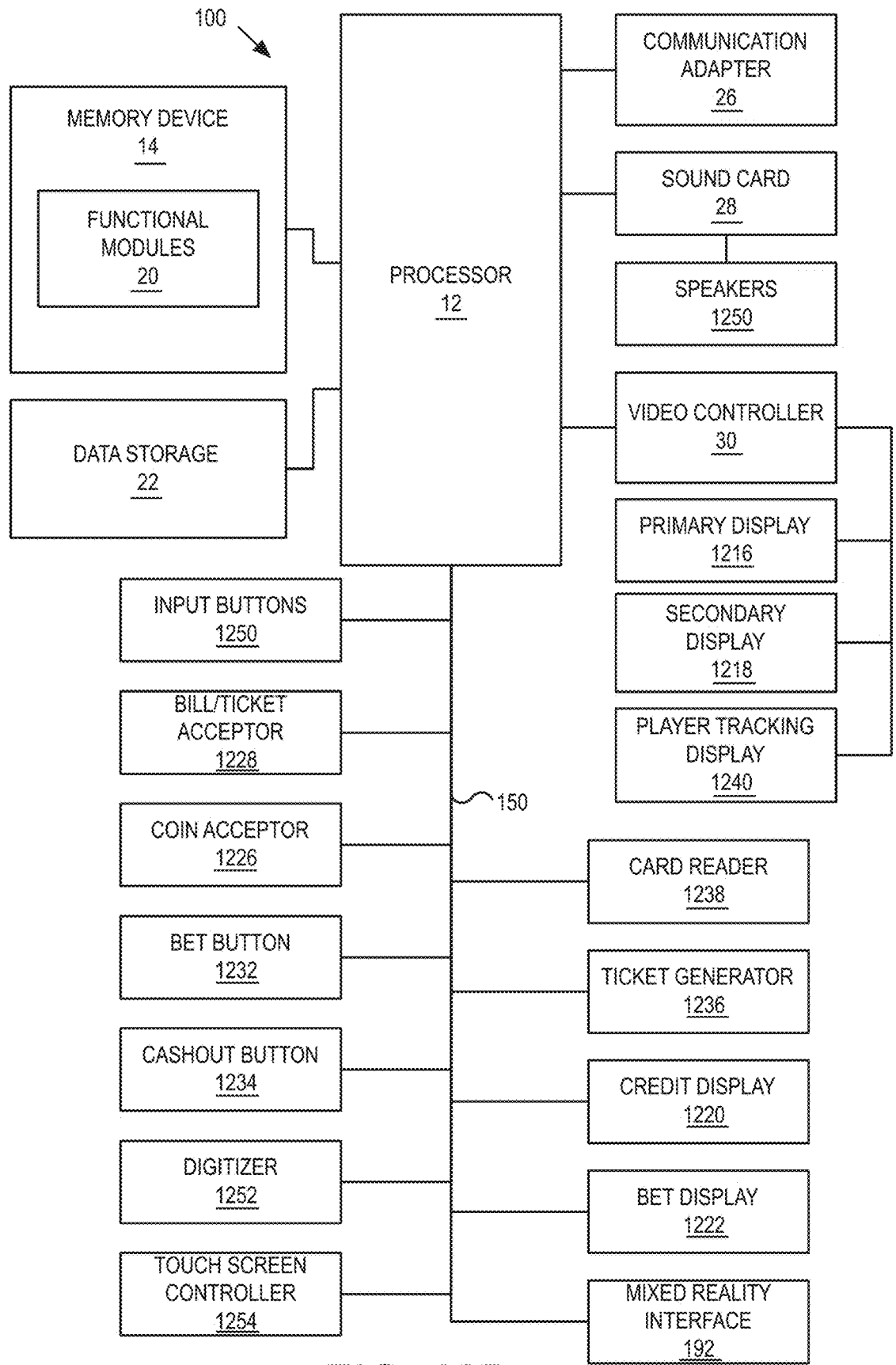
FIG. 12B is a schematic block diagram illustrating an electronic configuration for a gaming device according to some embodiments.
Figure 12C:
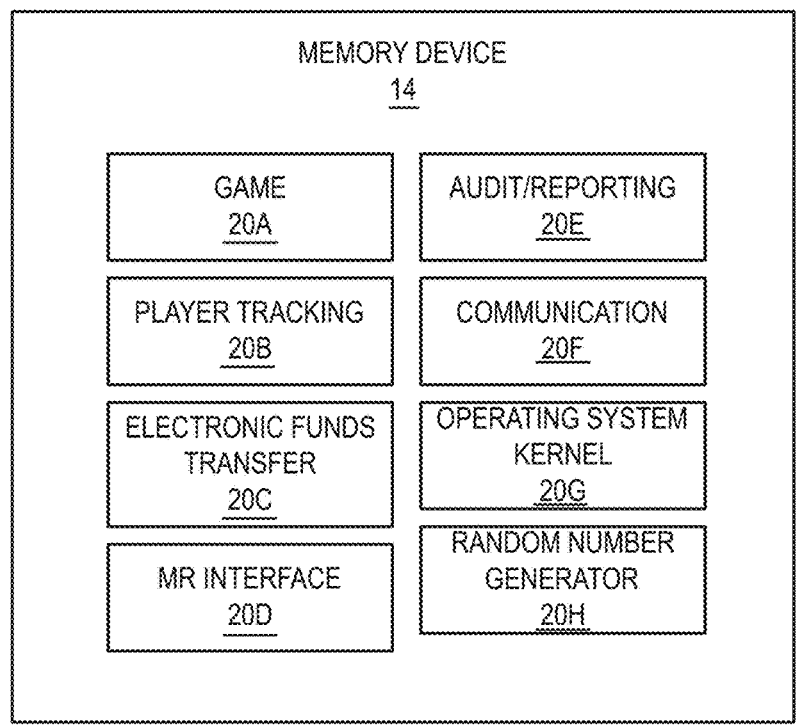
FIG. 12C is a block diagram that illustrates various functional modules of an electronic gaming device according to some embodiments.

An example of an electronic gaming machine (EGM) that can interact with mixed reality viewers according to various embodiments is illustrated in FIGS. 12A, 12B, and 12C in which FIG. 12A is a perspective view of an EGM 100 illustrating various physical features of the device, FIG. 12B is a functional block diagram that schematically illustrates an electronic relationship of various elements of the EGM 100, and FIG. 12C illustrates various functional modules that can be stored in a memory device of the EGM 100. The embodiments shown in FIGS. 12A to 12C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs may include a number of standard features, many of which are illustrated in FIGS. 12A and 12B. For example, referring to FIG. 12A, an EGM 100 may include a support structure, housing or cabinet 1205 which provides support for a plurality of displays, inputs, outputs, controls and other features that enable a player to interact with the EGM 100.

The EGM 100 illustrated in FIG. 12A includes a number of display devices, including a primary display device 1216 located in a central portion of a housing 1205 (e.g., a cabinet) and a secondary display device 1218 located in an upper portion of the cabinet 1205. It will be appreciated that one or more of the display devices 1216, 1218 may be omitted, or that the display devices 1216, 1218 may be combined into a single display device. The EGM 100 may further include a player tracking display 1240, a credit display 1220, and a bet display 1222. The credit display 1220 displays a player's current number of credits, cash, account balance or the equivalent. The bet display 1222 displays a player's amount wagered.

The player tracking display 1240 may be used to display a service window that allows the player to interact with, for example, their player loyalty account to obtain features, bonuses, comps, etc. In other embodiments, additional display screens may be provided beyond those illustrated in FIG. 12A.

The EGM 100 may further include a number of input devices that allow a player to provide various inputs to the EGM 100, either before, during or after a game has been played. For example, the EGM 100 may include a plurality of input buttons 1230 that allow the player to select options before, during or after game play. The EGM may further include a game play initiation button 1232 and a cashout button 1234. The cashout button 1234 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 12A and 12B includes a game play activation device in the form of a game play initiation button 1232. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 1252 and a touchscreen controller 1254 (FIG. 12B). The player may interact with the EGM 100 by touching virtual buttons on one or more of the display devices 1216, 1218, 1240. Accordingly, any of the above described input devices, such as the input buttons 1230, the game play initiation button 1232 and/or the cashout button 1234 may be provided as virtual buttons on one or more of the display devices 1216, 1218, 1240.

Referring briefly to FIG. 12B, operation of the primary display device 1216, the secondary display device 1218 and the player tracking display 1240 may be controlled by a video controller 30 that receives video data from a processor 12 or directly from a memory device 14 and displays the video data on the display screen. The credit display 1220 and the bet display 1222 are typically implemented as simple LCD or LED displays that display a number of credits available for wagering and a number of credits being wagered on a particular game. Accordingly, the credit display 1220 and the bet display 1222 may be driven directly by the processor 12. In some embodiments however, the credit display 1220 and/or the bet display 1222 may be driven by the video controller 30.

Referring again to FIG. 12A, the display devices 1216, 1218, 1240 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 1216, 1218, 1240 may include a touchscreen with an associated touchscreen controller 1254 and digitizer 1252. The display devices 1216, 1218, 1240 may be of any suitable size, shape, and/or configuration. The display devices 1216, 1218, 1240 may include flat or curved display surfaces.

The display devices 1216, 1218, 1240 and video controller 30 of the EGM 100 are generally configured to display one or more game and/or non-game images, symbols, and indicia. In certain embodiments, the display devices 1216, 1218, 1240 of the EGM 100 are configured to display any suitable visual representation or exhibition of the movement of objects; dynamic lighting; video images; images of people, characters, places, things, and faces of cards; and the like. In certain embodiments, the display devices 1216, 1218, 1240 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 1216, 1218, 1240 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 1236, a bill/ticket acceptor 1228, and a coin acceptor 1226 that allows the player to deposit coins into the EGM 100.

While not illustrated in FIG. 12A, the EGM 100 may also include a payment mechanism, which may include a coin and/or bill acceptor, a coin and/or bill dispenser, an electronic card reader including a magnetic and/or chip-based reader, and/or a wireless reader including a near-field communication (NFC), Bluetooth, Wi-Fi, or other type of wireless interface, for example.

The EGM 100 may further include one or more speakers 1250 controlled by one or more sound cards 28 (FIG. 12B). The EGM 100 illustrated in FIG. 12A includes a pair of speakers 1250. In other embodiments, additional speakers, such as surround sound speakers, may be provided within or on the cabinet 1205. Moreover, the EGM 100 may include built-in seating with integrated headrest speakers.

In various embodiments, the EGM 100 may generate dynamic sounds coupled with attractive multimedia images displayed on one or more of the display devices 1216, 1218, 1240 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 1238 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 12B is a block diagram that illustrates logical and functional relationships between various components of an EGM 100. As shown in FIG. 12B, the EGM 100 may include a processor 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 12 may be variously referred to as a "controller," "microcontroller," "microprocessor" or simply a "computer." The processor may further include one or more application-specific integrated circuits (ASICs).

Various components of the EGM 100 are illustrated in FIG. 12B as being connected to the processor 12. It will be appreciated that the components may be connected to the processor 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 12D.

The memory device 14 may store program code and instructions, executable by the processor 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferro-electric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 12. U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera in communication with the processor 12 (and possibly controlled by the processor 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 1216, 1218, 1240 may be configured to display the image acquired by the camera as well as display the visible manifestation of the game in split screen or picture-in-picture fashion. For example, the camera may acquire an image of the player and the processor 12 may incorporate that image into the primary and/or secondary game as a game image, symbol or indicia.

Various functional modules of that may be stored in a memory device 14 of an EGM 100 are illustrated in FIG. 12C. Referring to FIG. 12C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The wide area progressive (WAP) interface module 20D interacts with a remote WAP server to enable the EGM 100 to participate in a wide area progressive jackpot game as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand held device, a mobile device or any other suitable wireless device that enables a player to play any suitable game at a variety of different locations. It should also be understood that a gaming device or gaming machine as disclosed may include mechanical or electromechanical elements. Some game devices or game machines may facilitate play at a live table game, with the game device playing virtually at a live table game having otherwise real-world elements. It should be appreciated that a gaming device or gaming machine as disclosed herein may be a device that has obtained approval from a regulatory gaming commission or a device that has not obtained approval from a regulatory gaming commission.

Figure 12D:
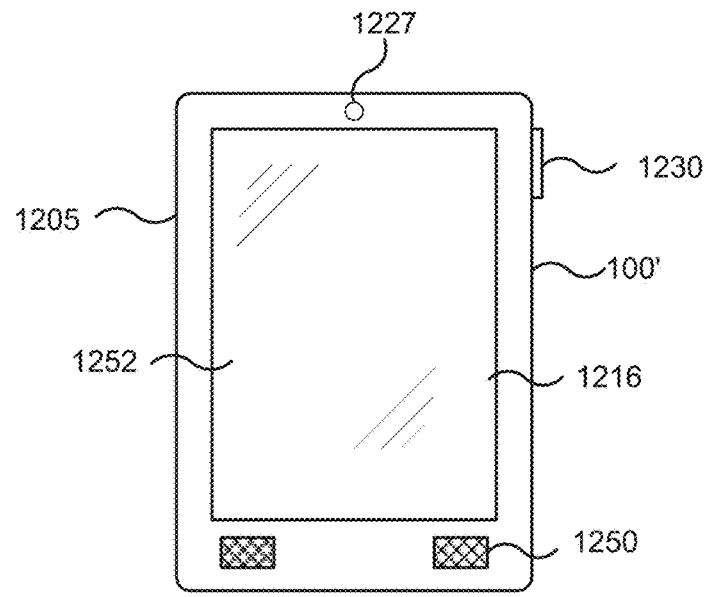
FIG. 12D is perspective view of a handheld electronic gaming device that can be configured according to some embodiments.

For example, referring to FIG. 12D, an EGM 100' may be implemented as a handheld device including a compact housing 1205 on which is mounted a touchscreen display device 1216 including a digitizer 1252. An input button 1230 may be provided on the housing and may act as a power or control button. A camera 1227 may be provided in a front face of the housing 1205. The housing 1205 may include one or more speakers 1250. In the EGM 100', various input buttons described above, such as the cashout button, game-play activation button, etc., may be implemented as soft buttons on the touchscreen display device 1216. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 12E:
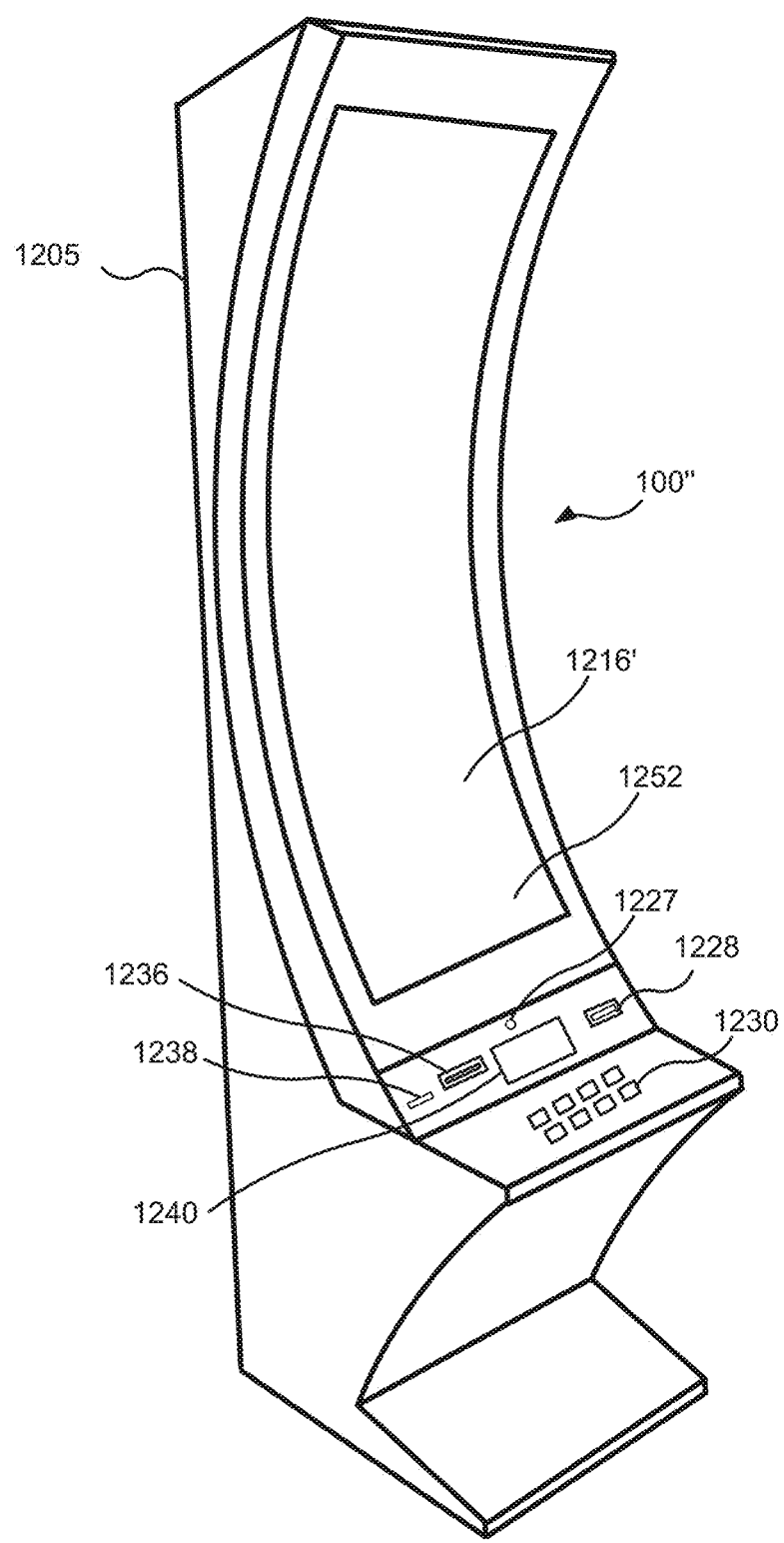
FIG. 12E is a perspective view of an electronic gaming device according to further embodiments.

FIG. 12E illustrates a standalone EGM 100" having a different form factor from the EGM 100 illustrated in FIG. 12A. In particular, the EGM 100" is characterized by having a large, high aspect ratio, curved primary display device 1216' provided in the housing 1205, with no secondary display device. The primary display device 1216' may include a digitizer 1252 to allow touchscreen interaction with the primary display device 1216'. The EGM 1200" may further include a player tracking display 1240, a plurality of input buttons 1230, a bill/ticket acceptor 1228, a card reader 1238, and a ticket generator 1236. The EGM 100" may further include one or more cameras 1227 to enable facial recognition and/or motion tracking.

Figure 13:
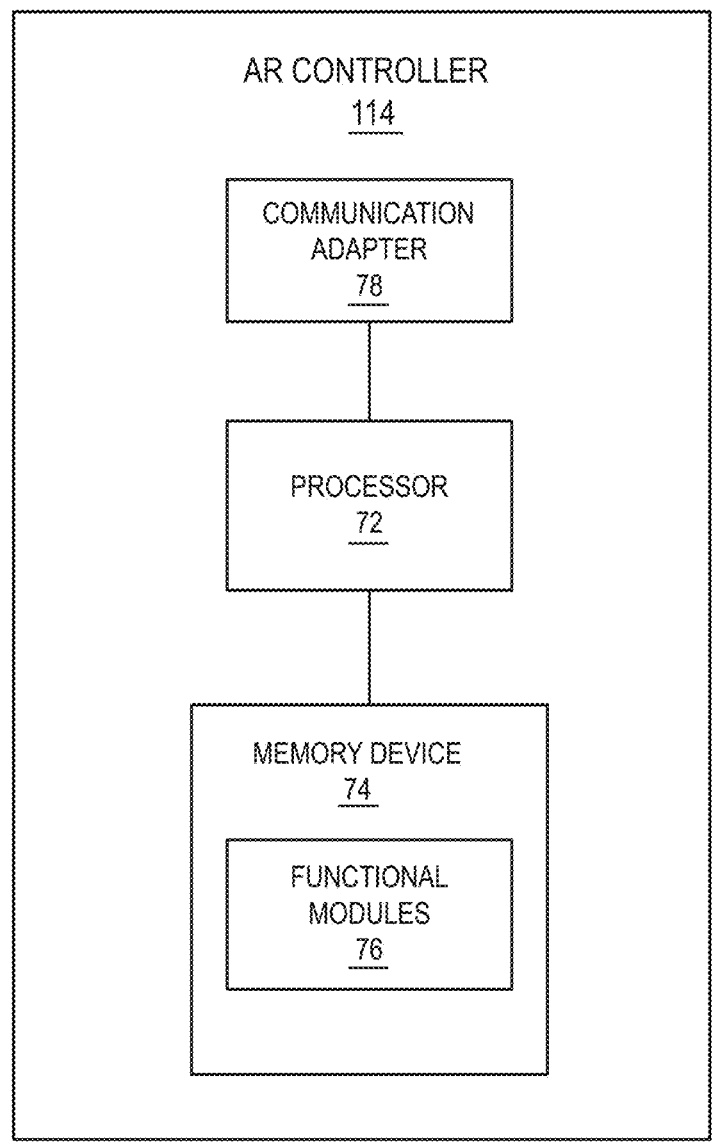
FIG. 13 is a schematic block diagram illustrating an electronic configuration for a mixed reality controller according to some embodiments.

FIG. 13 is a block diagram that illustrates various components of an AR controller 1214 according to some embodiment. As shown in FIG. 13, the AR controller 114 may include a processor 72 that controls operations of the AR controller 114. Although illustrated as a single processor, multiple special purpose and/or general purpose processors and/or processor cores may be provided in the AR controller 114. For example, the EGM 100 may include one or more of a video processor, a signal processor, a sound processor and/or a communication controller that performs one or more control functions within the EGM 100. The processor 72 may be variously referred to as a "controller," "microcontroller," "microprocessor" or simply a "computer." The processor may further include one or more application-specific integrated circuits (ASICs).

Various components of the AR controller 114 are illustrated in FIG. 13 as being connected to the processor 72. It will be appreciated that the components may be connected to the processor 72 through a system bus, a communication bus and controller, such as a USB controller and USB bus, a network interface, or any other suitable type of connection.

The AR controller 114 further includes a memory device 74 that stores one or more functional modules 76 for performing the operations described above.

The memory device 74 may store program code and instructions, executable by the processor 72, to control the AR controller 114. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The AR controller 114 may include a communication adapter 78 that enables the AR controller 114 to communicate with remote devices, such as EGMs 100 and/or a player tracking server 108 (FIG. 1) over a wired and/or wireless communication network, such as a local area network (LAN), wide area network (WAN), cellular communication network, or other data communication network.

The EGM 100 may include one or more internal or external communication ports that enable the processor 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 72.

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to an EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with a machine readable instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/" Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A method comprising:
   determining, by a processor circuit, a first game outcome of a wagering game based on a plurality of game symbols displayed by a gaming device;
   generating a live video signal of a scene associated with a field of view of a user, wherein the scene comprises the gaming device displaying the plurality of game symbols as part of the wagering game;
   determining, based on the live video signal, a virtual game symbol in real time;
   displaying, by a mixed reality display device, the virtual game symbol to the user as part of a mixed reality interface comprising the scene so that the virtual game symbol is associated with the gaming device, wherein the virtual game symbol is overlaid over a particular game symbol of the plurality of game symbols within the scene so that the virtual game symbol replaces the particular game symbol within the scene;
   based on the plurality of game symbols including the virtual game symbol and not including the particular game symbol, determining, by the processor circuit, a second game outcome different from the first game outcome, wherein the first game outcome is based on a first payout odds value associated with a gaming device interface of the gaming device without the mixed reality display device, and wherein the second game outcome is based on a second payout odds value associated with the mixed reality interface; and
   displaying an indication of the second game outcome by the mixed reality display device as part of the scene to change the first game outcome to the second game outcome.

2. The method of claim 1, wherein overlaying the virtual game symbol over a particular primary game symbol further comprises:
   overlaying a plurality of virtual game symbols including the virtual game symbol over a plurality of primary game symbols of a particular slot reel of a plurality of slot reels of the wagering game at a particular time while the plurality of slot reels are spinning during play of the wagering game, the plurality of virtual game symbols corresponding to the plurality of primary game symbols of the particular slot reel being displayed at the particular time, so that the particular slot reel appears to stop spinning while other slot reels of the plurality of slot reels continue to spin.

3. The method of claim 1, further comprising animating the virtual game symbol within the scene so that the virtual game symbol appears to move with respect to the plurality of game symbols.

4. The method of claim 3, wherein overlaying the virtual game symbol further comprises:
   overlaying the virtual game symbol over a particular static game symbol of the plurality of game symbols so that the virtual game symbol replaces the particular static game symbol within the scene.

5. The method of claim 3, wherein overlaying the virtual game symbol further comprises overlaying a plurality of virtual game symbols including the virtual game symbol over a subset of the plurality of game symbols, and
   wherein animating the virtual game symbol comprises animating the plurality of virtual game symbols to display an animation across the subset of the plurality of game symbols.

6. The method of claim 1, further comprising:
   displaying an information display element within the scene so that the information display element is associated with the gaming device.

7. The method of claim 6, wherein the information display element comprises an indication of gambling losses by the user over a predetermined time period.

8. The method of claim 6, wherein the information display element comprises a warning indication that indicates a limitation on play of the wagering game by the user, the method further comprising:
   configuring the gaming device based on the limitation on play of the wagering game for the user so that a rate of play of the wagering game by the user is reduced.

9. The method of claim 6, wherein displaying the information display element comprises displaying an offer in response to the user winning a payout for the wagering game, wherein the offer comprises a wager based on the payout.

10. The method of claim 9, wherein the wager based on the payout comprises a bonus bet that is equal to the payout and that has a bonus payout equal to twice the bonus bet.

11. The method of claim 1, further comprising:
    displaying a virtual creature to the user as part of the scene so that the creature appears to be interacting with the gaming device to indicate an increased payout odds value for the wagering game based on the interaction.

12. The method of claim 11, wherein displaying the creature so that the creature appears to be interacting with the gaming device comprises displaying the creature so that the creature appears to be damaging the gaming device to indicate an increased payout odds value for the wagering game based on the appearance of damage.

13. The method of claim 1, further comprising:
displaying a virtual mechanical game to the user as part of the scene so that the virtual mechanical game appears to be part of the gaming device.

14. The method of claim 13, wherein the virtual mechanical game is a virtual pinball machine.

15. The method of claim 1, wherein the plurality of game symbols displayed by the gaming device are selected from a first set of available game symbols for the wagering game that does not include the virtual game symbol.

16. The method of claim 15, wherein the first set of available game symbols associated with the first game outcome is associated with a first payout odds value, and wherein a second set of available game symbols associated with the second game outcome comprises the first set of available game symbols and the virtual game symbol, wherein the second set of available game symbols is associated with a second payout odds value greater than the first payout odds value.

17. A mixed reality system comprising:
a video capture device;
a display;
a processor device; and
a memory coupled to the processor device, the memory comprising machine readable instructions for causing the processor device to:
determine a first game outcome of a wagering game based on a plurality of game symbols displayed by a gaming device;
generate, via the video capture device, a live video signal of a scene associated with a field of view of a user, wherein the scene comprises the gaming device displaying the plurality of game symbols and a first game outcome based on the plurality of game symbols as part of the wagering game;
determine, based on the live video signal, a virtual game symbol in real time;
display the virtual game symbol to the user, via the display, as part of the scene so that the virtual game symbol is associated with the gaming device in a mixed reality interface,
wherein the virtual game symbol is overlaid over a particular game symbol of the plurality of game symbols within the scene so that the virtual game symbol replaces the particular game symbol within the scene;
based on the plurality of game symbols including the virtual game symbol and not including the particular game symbol, determine a second game outcome different from the first game outcome, wherein the first game outcome is selected from a first set of outcomes associated with a gaming device interface of the gaming device without the mixed reality system, and wherein the second game outcome is selected from a second set of outcomes associated with the mixed reality interface, wherein the second set of outcomes are more favorable the user than the first set of outcomes; and
display an indication of the second game outcome by the display as part of the scene to change the first game outcome to the second game outcome.

18. A mixed reality system comprising:
a video capture device;
a display;
a processor device; and
a memory coupled to the processor device, the memory comprising machine readable instructions for causing the processor device to:
determine a first game outcome of a wagering game based on a plurality of game symbols displayed by a gaming device, wherein the plurality of game symbols are selected from a first set of available game symbols associated with a first payout odds value;
generate, via the video capture device, a live video signal of a scene associated with a field of view of a user, wherein the scene comprises the gaming device displaying the plurality of game symbols as part of the wagering game;
determine, based on the live video signal, a virtual game symbol in real time, wherein the virtual game symbol is selected from a second set of available game symbols associated with a second payout odds value greater than the first payout odds value;
display the virtual game symbol to the user, via the display, as part of the scene so that the virtual game symbol is associated with the gaming device in a mixed reality interface,
wherein the virtual game symbol is overlaid over a particular game symbol of the plurality of game symbols within the scene so that the virtual game symbol replaces the particular game symbol within the scene;
based on the plurality of game symbols including the virtual game symbol and not including the particular game symbol, determine a second game outcome different from the first game outcome, wherein the first game outcome is based on a first payout odds value associated with a gaming device interface of the gaming device without the mixed reality system, and wherein the second game outcome is based on a second payout odds value associated with the mixed reality interface; and
display an indication of the second game outcome by the display as part of the scene to change the first game outcome to the second game outcome.

19. The system of claim 18, wherein the first set of available game symbols does not include the virtual game symbol.

* * * * *